United States Patent
Pang et al.

(10) Patent No.: US 11,275,288 B2
(45) Date of Patent: Mar. 15, 2022

(54) BALLISTIC LIGHT MODULATIONS FOR IMAGE ENHANCEMENT THROUGH FOG

(71) Applicants: STANLEY ELECTRIC CO., LTD., Tokyo (JP); LINOPTX, LLC, San Diego, CA (US)

(72) Inventors: Lin Pang, San Diego, CA (US); Tomofumi Yamamuro, San Diego, CA (US)

(73) Assignees: STANLEY ELECTRIC CO., LTD., Tokyo (JP); LINOPTX, LLC, San Diego, CA (US)

( * ) Notice: Subject to any disclaimer, the term of this patent is extended or adjusted under 35 U.S.C. 154(b) by 0 days.

(21) Appl. No.: 17/053,157

(22) PCT Filed: Dec. 10, 2019

(86) PCT No.: PCT/US2019/065410
§ 371 (c)(1),
(2) Date: Nov. 5, 2020

(87) PCT Pub. No.: WO2020/159622
PCT Pub. Date: Aug. 6, 2020

(65) Prior Publication Data
US 2021/0250479 A1    Aug. 12, 2021

Related U.S. Application Data

(60) Provisional application No. 62/797,363, filed on Jan. 28, 2019, provisional application No. 62/797,366, filed on Jan. 28, 2019.

(51) Int. Cl.
*H04N 5/225* (2006.01)
*G02F 2/02* (2006.01)
(Continued)

(52) U.S. Cl.
CPC ............. *G02F 2/02* (2013.01); *B60Q 1/1407* (2013.01); *B60Q 1/1423* (2013.01); *B60Q 1/20* (2013.01);
(Continued)

(58) Field of Classification Search
CPC . G02F 2/02; F21S 41/16; F21S 41/125; F21S 41/60; F21V 9/30; G01S 17/04; B60Q 1/1407; B60Q 1/1423; B60Q 1/20
See application file for complete search history.

(56) References Cited

U.S. PATENT DOCUMENTS

| 7,461,092 | B1 | 12/2008 | Sigel et al. |
| 9,829,858 | B2 | 11/2017 | Christmas et al. |

(Continued)

FOREIGN PATENT DOCUMENTS

| JP | 2019-027974 A | 2/2019 |
| JP | 2019-092088 A | 6/2019 |

OTHER PUBLICATIONS

International Search Report and Written Opinion received for PCT Application No. PCT/US2019/065410, dated Feb. 11, 2020, 10 pages.

(Continued)

*Primary Examiner* — Jonathan R Messmore
(74) *Attorney, Agent, or Firm* — Xsensus LLP

(57) ABSTRACT

An adaptive lighting apparatus includes a light source, a spatial light modulator, and processing circuitry. Further, the processing circuitry is configured to drive the spatial light modulator by a modulation signal for irradiating patterns for generating one or more localized illuminations, scan the one or more localized illuminations on the target object based on the patterns, and calculate, in advance, the patterns so that light intensity of the one or more localized illuminations is (Continued)

enhanced on a virtual target located at a predetermined distance and without a scattering medium.

20 Claims, 22 Drawing Sheets

(51) Int. Cl.
| | |
|---|---|
| G02F 1/01 | (2006.01) |
| F21S 41/16 | (2018.01) |
| F21S 41/125 | (2018.01) |
| F21S 41/60 | (2018.01) |
| F21V 9/30 | (2018.01) |
| B60Q 1/14 | (2006.01) |
| F21V 9/08 | (2018.01) |
| F21V 9/14 | (2006.01) |
| F21V 14/00 | (2018.01) |
| G01S 17/04 | (2020.01) |
| B60Q 1/20 | (2006.01) |
| G01N 21/47 | (2006.01) |
| G01S 17/10 | (2020.01) |
| H04N 5/272 | (2006.01) |
| F21Y 115/30 | (2016.01) |
| F21Y 115/10 | (2016.01) |
| F21W 102/20 | (2018.01) |

(52) U.S. Cl.
CPC ............ *F21S 41/125* (2018.01); *F21S 41/16* (2018.01); *F21S 41/60* (2018.01); *F21V 9/08* (2013.01); *F21V 9/14* (2013.01); *F21V 9/30* (2018.02); *F21V 14/003* (2013.01); *G01N 21/4795* (2013.01); *G01S 17/04* (2020.01); *G01S 17/10* (2013.01); *G02F 1/0105* (2013.01); *H04N 5/2256* (2013.01); *H04N 5/272* (2013.01); *F21W 2102/20* (2018.01); *F21Y 2115/10* (2016.08); *F21Y 2115/30* (2016.08); *G02F 2203/12* (2013.01); *G02F 2203/50* (2013.01)

(56) References Cited

U.S. PATENT DOCUMENTS

| | | | |
|---|---|---|---|
| 9,891,393 B2 | 2/2018 | Reece | |
| 2006/0115126 A1* | 6/2006 | Watanabe | G06T 7/593 |
| | | | 382/106 |
| 2010/0253541 A1* | 10/2010 | Seder | G08G 1/165 |
| | | | 340/905 |
| 2012/0206050 A1* | 8/2012 | Spero | H05B 47/11 |
| | | | 315/152 |
| 2015/0009695 A1* | 1/2015 | Christmas | F21S 41/645 |
| | | | 362/466 |
| 2018/0113200 A1* | 4/2018 | Steinberg | G01S 17/93 |
| 2018/0199017 A1* | 7/2018 | Michaelis | H04N 9/3152 |
| 2018/0302542 A1* | 10/2018 | Masumura | H04N 5/2256 |
| 2020/0226393 A1* | 7/2020 | Han | B60K 35/00 |

OTHER PUBLICATIONS

Extended European search report dated Mar. 23, 2021, in corresponding European patent Application No. 20212289.1, 8 pages.

* cited by examiner

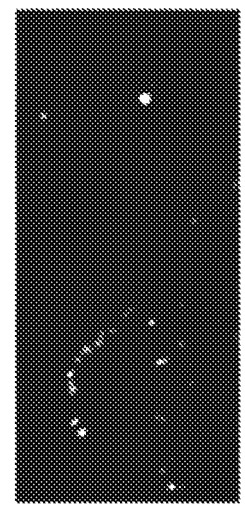
*Fig. 5D*
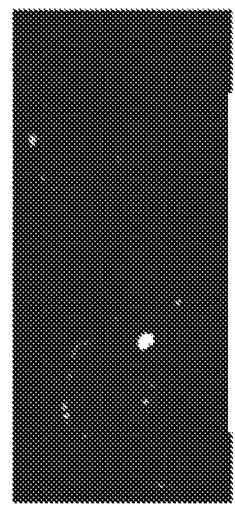
*Fig. 5G*
*Fig. 5C*
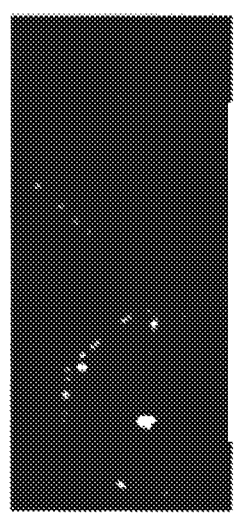
*Fig. 5F*
*Fig. 5A*
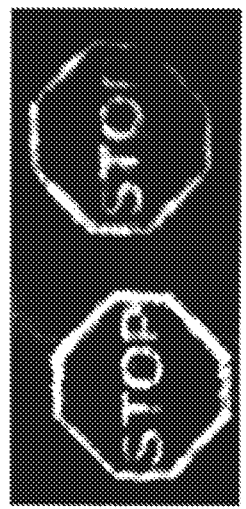
*Fig. 5B*
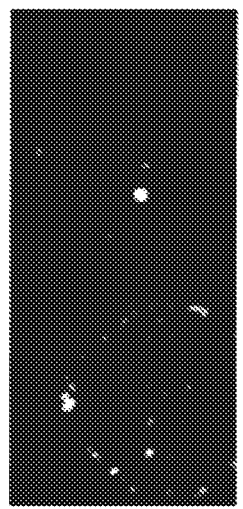
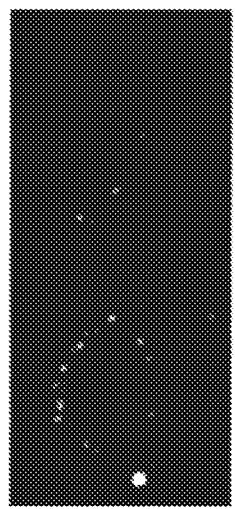
*Fig. 5E*

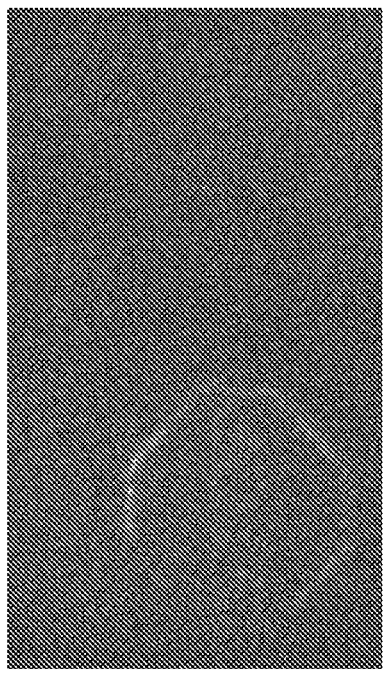
Fig. 8A Normal Illumination
Fig. 8B Averaging
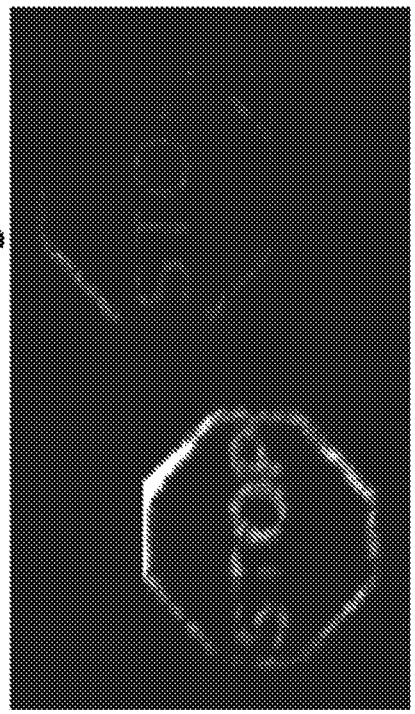
Fig. 8C Confocal Image

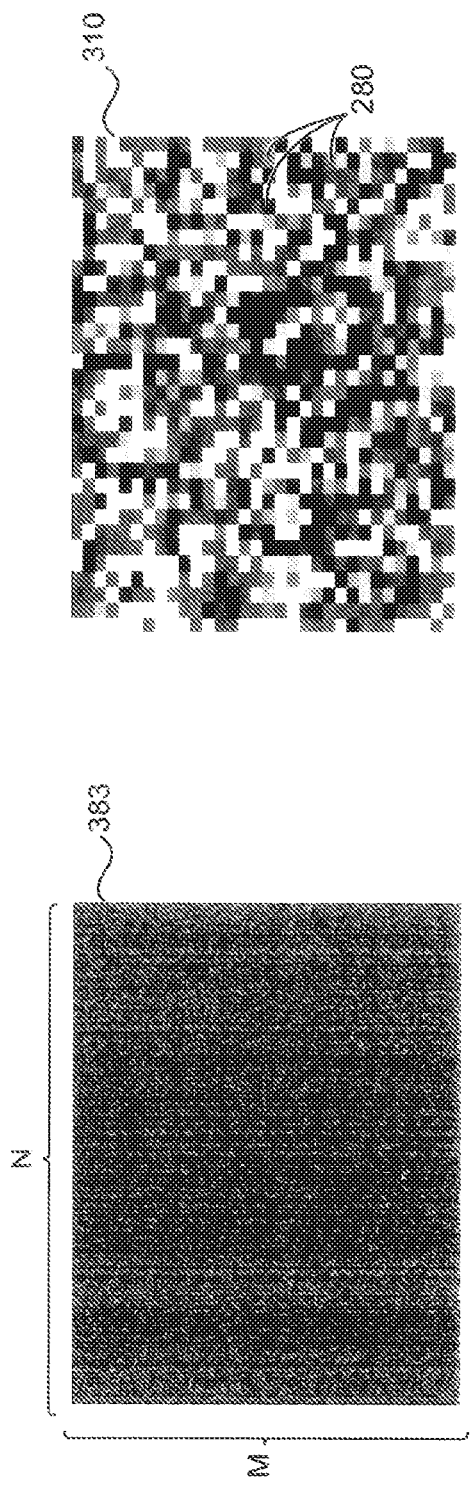
Figure 12A
Figure 12B
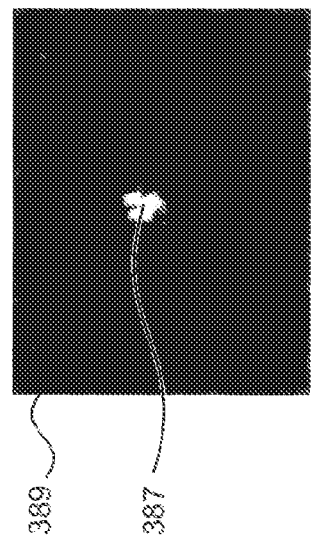
Figure 12C

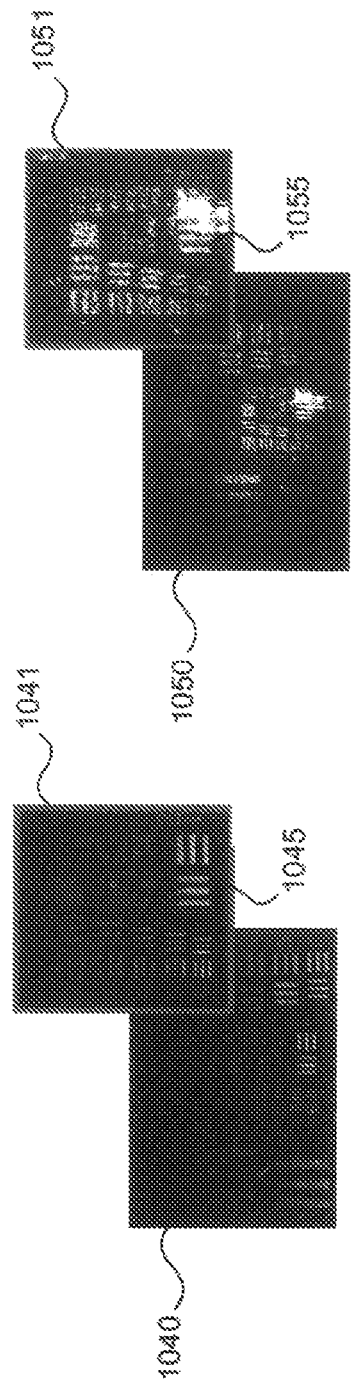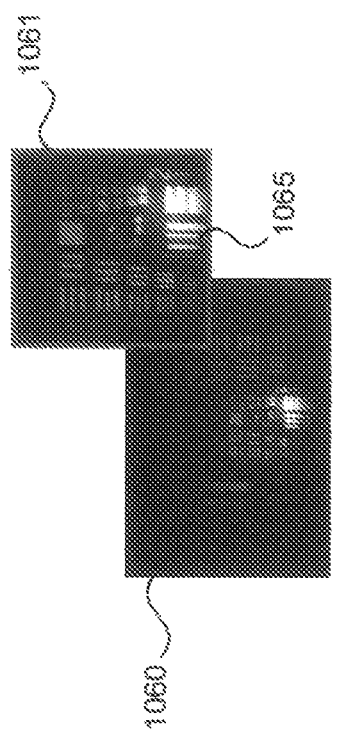
Figure 19A
Figure 19B
Figure 19C

BALLISTIC LIGHT MODULATIONS FOR IMAGE ENHANCEMENT THROUGH FOG

CROSS-REFERENCE TO RELATED APPLICATIONS

This application is based on PCT filing PCT/US2019/065410, filed Dec. 10, 2019, which claims the benefit of U.S. Provisional Application No. 62/797,363, filed Jan. 28, 2019 and 62/797,366, filed Jan. 28, 2019, each are incorporated herein by reference in their entirety. Additionally, related applications 13060US01, 13061US01, and 13062US01, are herein incorporated by reference in their entirety.

BACKGROUND

Many applications involve transmitting light through scattering media such as fog, rain, snow, dust, and/or pollution. For example, a vehicle driving on the road and navigating through traffic may also have to operate in one or more of these scattering media. Similarly, for planes at an airport, underwater communication, tissues in biological imaging, and the like, vision can be affected by the scattering processing of the media. When attempting to image through these scattering media, there are several adverse effects. For example, images get dimmer due to the absorptions, heavy scattering of the light causes light to be scattered into other paths instead into the receiver or human eyes, and images get distorted due to wave front distortion from the target objects by the nonuniform scattering media. Additionally, image contrast gets lowered due to strong backscattering by the scattering media and weak signal information acquired from the target object behind the scattering media. For example, this can often happen in traffic during heavy fog, rain, or snow conditions where the driver's vision is affected and target objects like traffic signs, roadside marks, pedestrians, and the like are more difficult to see.

In order to see the marks more clearly, the driver often increases the illumination by switching on the high-power headlamps (i.e., high beams). However, instead of observing clearer traffic signs by using the high beams, the driver sees a bright 'wall', or glare, in front of the driver's car due to the strong backscattered light by the water particles in the air. This can also be referred to as backscattered noise. The backscattered noise makes it even more difficult for the driver to see, which can put the driver in dangerous driving situations that put the driver and others at risk. Subsequent consequences can include an economic impact in already poor weather conditions by shutting down the highways, for example. This problem also greatly affects the deployment of autonomous vehicles due to the unsolved issues for robustly imaging through scattering media.

Various approaches have been proposed to address how to reduce the effect of the backscattered noise. For example, one approach is time gating detection which aims to only detect the signal information by timely opening the detector to receive the reflected signal from the target objects while reducing the detection of the backscattered noise to increase the signal to noise ratio. In this approach, the moment of turning on the detector, or the distance between the target and the detector, should be known in advance. The issue in this approach is the real-time feedback information required to acquire accurate information about the distance between the target objects and the car (driver) when the target objects move, for example. Although the synchronized pulse illumination is used to acquire the distance, similar like in Lidar, less information acquired by the detector under the severe weather condition may not be enough to distinguish the target object. Temporally statistical analysis was proposed to filter out the object target behind the fog by employing the avalanche photodiode array. However, the statistic noise could sometime cause false positive response. Another method is to reduce the backscattered noise by adopting the audio noise cancelation approach, in which a reference beam with opposite optical phase (pi phase shift compared to the backscattered noise) is introduced to destructively interfere with the backscattered noise. Because the phase distribution of the backscattered noise, measured or calculated by the known approaches, might include all the distribution from the different layers of the scattering media, the opposite phase added on the reference light beam cannot sufficiently cancel all the noise. In other words, the backscattered noise might be already the results of the interference among the backscattered light beams from different layers. Further, it might be necessary to distinguish the backscattered noise from the signal light reflected from the target objects received by the detector.

The quality of the image in the optical system depends on the intensity (brightness), contrast (signal to noise ratio), and resolution of the imaging system. When bad weather condition appears, the backscattered noise reduces the contrast, scattering processing significantly reduces the light reflected from the target objects and prevents it from reaching the detector. Further, the heavy scattering processing can distort the imaging because of the nonuniform scattering media added on the light when they pass through the scattering media. Improving the imaging quality by improving the visualization through the scattering media needs to address these three issues.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, an apparatus includes a light source, a spatial light modulator, and processing circuitry. Further, the processing circuitry configured to drive the spatial light modulator by a modulation signal for irradiating patterns for generating one or more localized illuminations, scan the one or more localized illuminations on the target object based on the patterns, and calculate, in advance, the patterns so that light intensity of the one or more localized illuminations is enhanced on a virtual target located at a predetermined distance and without a scattering medium.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A illustrates exemplary images of target objects acquired without fog according to one or more aspects of the disclosed subject matter;

FIG. 5B illustrates an exemplary localized illumination on the target according to one or more aspects of the disclosed subject matter;

FIG. 5C illustrates an exemplary localized illumination on the target according to one or more aspects of the disclosed subject matter;

FIG. 5D illustrates an exemplary localized illumination on the target according to one or more aspects of the disclosed subject matter:

FIG. 5E illustrates an exemplary localized illumination on the target according to one or more aspects of the disclosed subject matter;

FIG. 5F illustrates an exemplary localized illumination on the target according to one or more aspects of the disclosed subject matter;

FIG. 5G illustrates an exemplary localized illumination on the target according to one or more aspects of the disclosed subject matter;

FIG. 8A illustrates an image obtained in heavy fog condition with normal illumination according to one or more aspects of the disclosed subject matter:

FIG. 8B illustrates an image processed using averaging according to one or more aspects of the disclosed subject matter:

FIG. 8C illustrates an image processed using confocal imaging according to one or more aspects of the disclosed subject matter;

FIG. 12A is a schematic diagram of a transmission matrix of a surrounding environment acquired using the lighting and/or imaging system and/or the vehicle headlamp system according to one or more aspects of the disclosed subject matter;

FIG. 12B is a schematic diagram of an optimized spatial phase distribution in a modulation pattern derived from the transmission matrix according to one or more aspects of the disclosed subject matter:

FIG. 12C is an intensity plot corresponding to the modulation pattern in FIG. 12B according to one or more aspects of the disclosed subject matter;

FIG. 19A is an image of an object in the absence of scattering media according to one or more aspects of the disclosed subject matter;

FIG. 19B is an image of the object shown in FIG. 19A before optimization in the presence of a scattering media according to one or more aspects of the disclosed subject matter;

FIG. 19C is a hybrid image of the object shown in FIGS. 19A and 19B after optimization in the presence of the scattering media according to one or more aspects of the disclosed subject matter.

DETAILED DESCRIPTION

Figure 1:
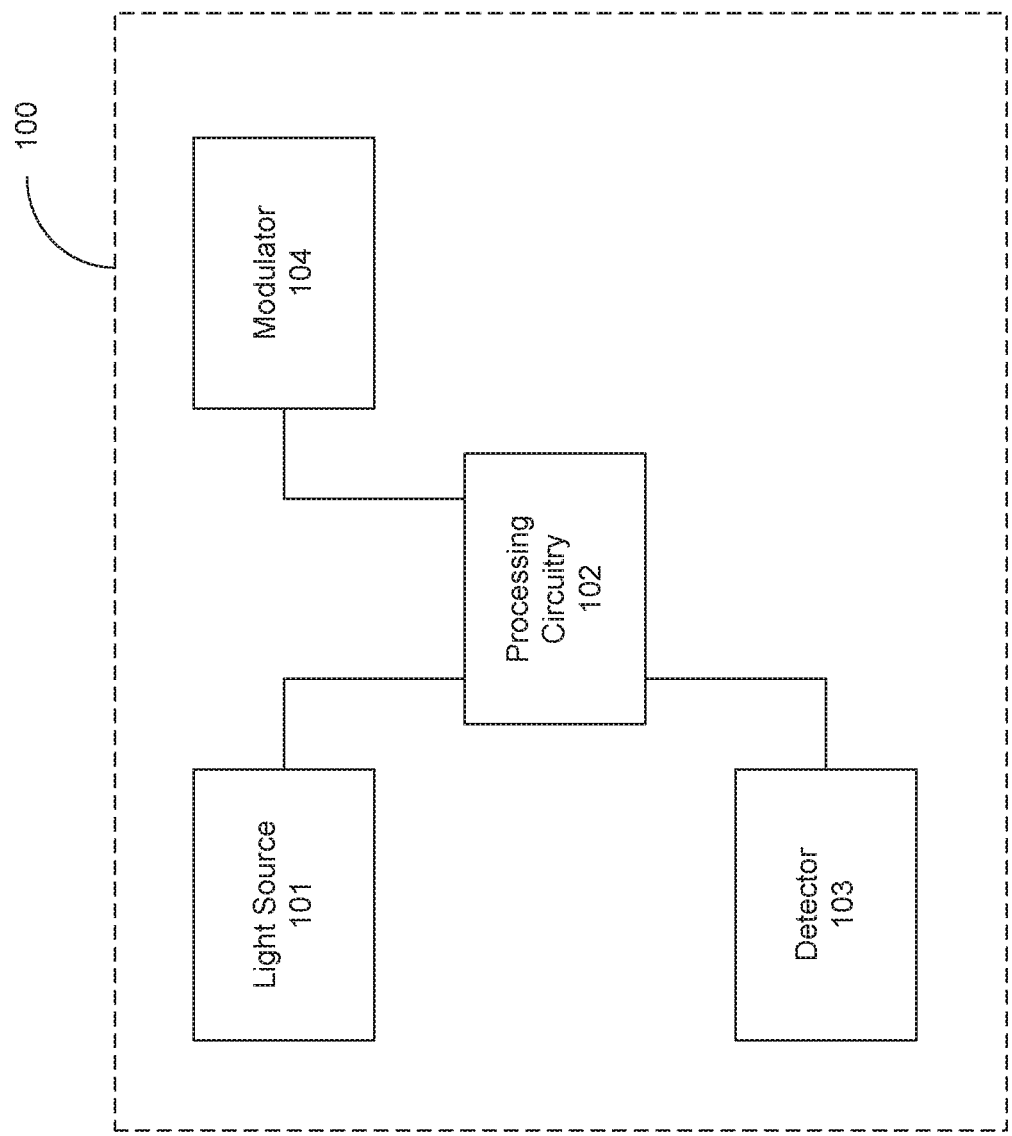
FIG. 1 illustrates an exemplary adaptive illumination imaging system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1 illustrates an exemplary adaptive illumination imaging system 100 (herein referred to as the system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The system 100 can include a light source 101, processing circuitry 102 (which can include internal and/or external memory), a detector 103, and a modulator 104. Further, the aforementioned components can be electrically connected or in electrical or electronic communication with each other as diagrammatically represented by FIG. 1, for example. In one or more aspects of the disclosed subject matter, the system 100 including the light source 101, the processing circuitry 102, the detector 103, and the modulator 104 can be implemented as various apparatuses that perform imaging through a scattering medium. For example, the system 100 can be a headlight of an autonomous vehicle where the headlight can adapt to fog (and/or other scattering media). As a result, the autonomous vehicle can more clearly image the road ahead in and through the fog, thus improving the autonomous driving capability in the scattering medium. Additionally, in another embodiment, the system 100 can be an apparatus for real-time in vivo imaging through biological tissue, in which the system 100 can overcome the dynamic scattering processing caused by the physiological environment.

The light source 101 can represent one or more light sources in the system 100. For example, the light source 101 can be the headlamp of a vehicle.

The processing circuitry 102 can carry out instructions to perform or cause performance of various functions, operations, steps, or processes of the system 100. In other words, the processor/processing circuitry 102 can be configured to receive output from and transmit instructions to the one or more other components in the system 100 to operate the system 100 to use ballistic light modulation to for image enhancement in and/or through a scattering medium.

The detector 103 can represent one or more detectors in the system 100. In one or more aspects of the disclosed subject matter, the detector 103 can be an image capturer. Although other types of detectors can be contemplated, imaging device, image capturer, detector, receiver, and the like can be used interchangeably herein.

The modulator 104 can represent one or more modulators in the system 100. The modulator can be a spatial light modulator (SLM). For example, the modulator 104 can be a Digital Micromirror Device (DMD) which can include a plurality of micromirrors arranged in a matrix.

Generally speaking, in an optical imaging system imaging in and/or through heavy scattering media (e.g., fog, rain, snow, sleet, pollution, etc.), various techniques can contribute to improving the imaging quality. For example, reducing the backscattered noise on the receiver to increase the imaging contrast, increasing the optical power hit on the target objects behind or inside the scattering media to increase the brightness, and reducing the distortion noise induced by the scattering media can improve the imaging quality. More specifically, converting originally scattered light back into the imaging system can increase the signal on the detector. Therefore, evaluating the scattering medium itself by acquiring the transmission matrix of the scattering medium and increasing the forward scattering to illuminate more energy on the target objects can significantly improve the visualization. The transmission matrix can be acquired by calculating light distributions on the spatial light modulator and the corresponding output through the scattering medium to reduce the backscattered noise. The measured transmission matrix can also be employed to form localized illuminations scanning the targets to amplify the contrast and the brightness, while the scanned illumination from the different angles reveal the hidden information of the target objects compared with the normal illumination. As a result, high resolution of the imaging can be achieved.

The above approach is based on the transmission matrix of the scattering medium being established in time. The time duration to evaluate the transmission matrix of a scattering medium greatly depends on the number of elements used in the incident pattern. For example, using a spatial light modulator (SLM) (e.g., with 60 Hz framerate, 16G memory computer) as an incident channel provider, the time to evaluate the transmission matrix is less than 3 minutes for 16×16 incident channels, 10 minutes for 32×32 incident channels, 40 minutes for 64×64 channels, and more than 8 hours for 128×128 incident channels. Reducing the time duration can be achieved by employing fast modulator such as a digital micromirror device (DMD), for example, which could reach 20 KHz framerate. Still, tens of seconds will be needed to evaluate the transmission matrix. Even when a Field Programmable Gate Array (FPGA) is employed, it would take 200 ms to evaluate the transmission matrix for a single optimized phase pattern of 64×64 elements, not to mention usually hundreds or thousands of optimized patterns are needed to fulfill the image processing.

The evaluation of scattering medium requires that the scattering medium maintains its scattering properties during the processing. In other words, the scattering medium would have to be static or have a long decorrelation time. However, for scattering media in real world applications (e.g., fog), the decorrelation time usually is very short. For example, the decorrelation time of biological tissue is about 50 ms resulting from the blood flow, while the decorrelation time for fog is shorter than 5 ms due to the fast motion of the water particles in the air. In one or more aspects of the disclosed subject matter, techniques for evaluating a fast scattering medium such as fog within the decorrelation time are proposed. For example, rather than modulating the light to control the scattered light, the system can be configured to control the ballistic light (i.e., the un-scattered light) to enhance the image blurred by the heavy scattering caused by the fog. In one embodiment, the system can be configured to control only the ballistic light to enhance the image blurred by the heavy scattering caused by the fog.

Figure 2A:
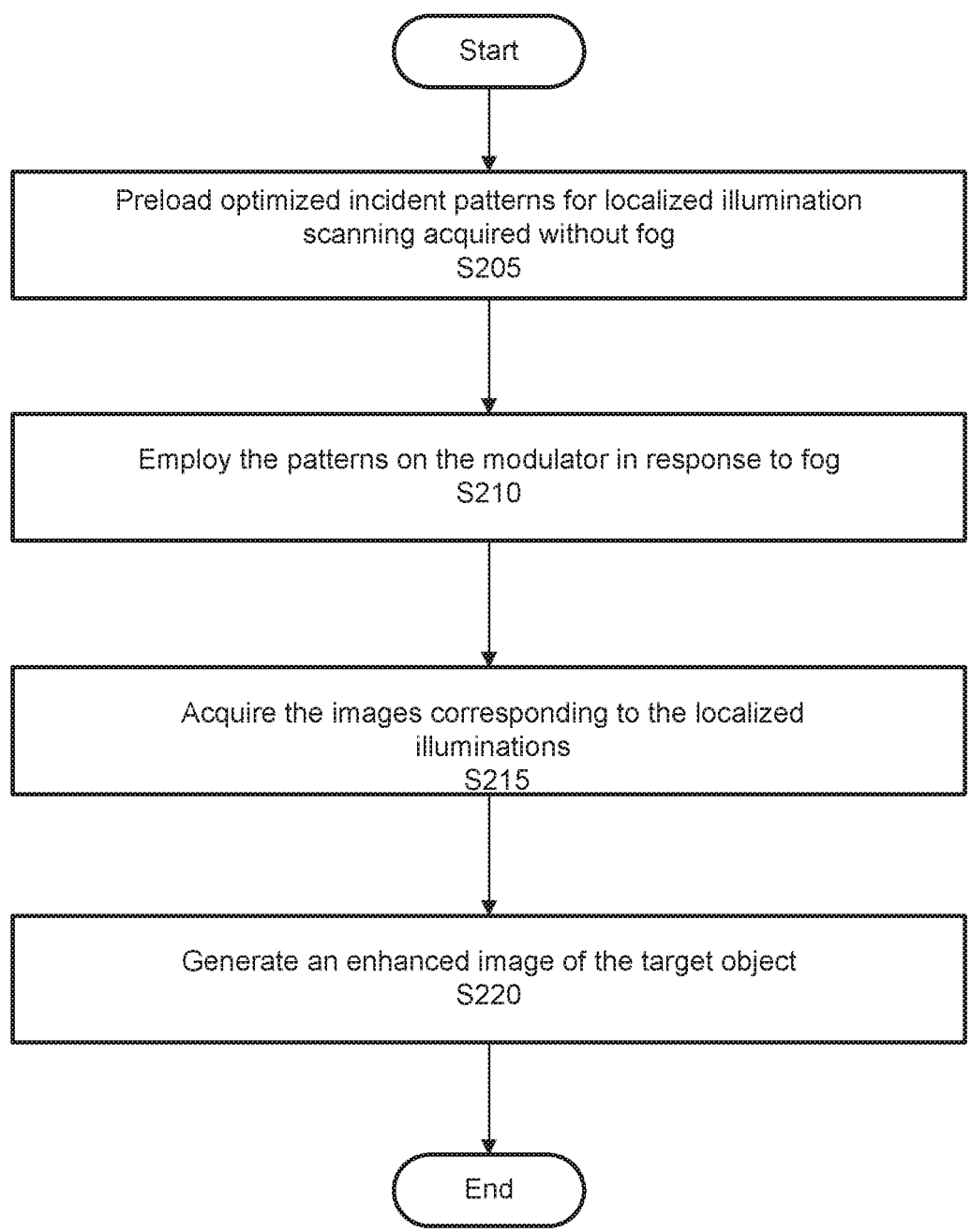
FIG. 2A is an algorithmic flow chart of a method for enhancing an image blurred by a scattering medium according to one or more aspects of the disclosed subject matter.

FIG. 2A is an algorithmic flow chart of a method for enhancing an image blurred by a scattering medium according to one or more aspects of the disclosed subject matter.

In S205, the processing circuitry 102 preloads the optimized incident patterns (phase/amplitude) corresponding to localized illuminations on the object plane. The optimized incident patterns can be acquired beforehand within the system 100 without the moving scattering medium (e.g., fog). For example, the optimized incident patterns can be calculated in advance so that light intensity of the one or more localized illuminations are enhanced on a virtual target located at a predetermined distance and without a scattering medium. It should be appreciated that in one embodiment, the irradiation patterns (e.g., the optimized incident patterns) can form one localized illumination or a plurality of localized illuminations. When the modulator forms a plurality of localized illuminations, the optimized incident patterns also make a plurality of the same localized illuminations. Accordingly, when the modulator forms a plurality of localized illuminations, the scan time can be shortened. "Localized illumination" can refer to a region (or point) with enhanced light intensity on a target and/or virtual target. In one aspect, the light intensity of the localized illumination is maximized on a target. In various optimized incident patterns, the localized illumination can be made singular or plural.

In S210, the processing circuitry 102 can employ the preloaded patterns on the modulator 104 in response to the fog. Generally, all the optimized patterns for the localized illuminations for the ballistic light can be preloaded into the memory and the system (e.g., the system 100) can choose which patterns will be applied on the modulator for localized illuminations on the target object based on the specific visualization requirement. For example, they system 100 can drive the spatial light modulator by modulation signals for irradiation patterns for generating one or more localized illuminations so that the one or more localized illuminations are arranged in a matrix on the target object. Accordingly, the system 100 can scan the one or more localized illuminations on the target object based on the patterns. In other words, when fog builds up and affects visibility (e.g., vision of the driver and/or image capturing device), the optimized patterns are employed onto the modulator 104 and projected into the fog to form the localized illuminations on the target object. Although the illumination light is scattered heavily by the fog, the localized illuminations reflect strong light back into the system 100 and can be captured by the detector 103 in S215.

In S215, the processing circuitry 102 can acquire the images corresponding to the localized illuminations formed in S210. The localized light scanning illuminates the target object point by point, enabling the detection of the points on the target object.

In S220, the processing circuitry 102 can generate an enhanced image of the illuminated target object based on the detected localized illuminations. For example, the detector 103 can be capture one or more images of the target object (e.g., corresponding to the localized illuminations) so that the data from the one or more images can be used to generate the enhanced image. The enhanced image can be generated via various image processing to increase the image brightness, contrast, resolution, and overall quality. For example, the image processing can include confocal imaging, structural imaging (synthetic aperture imaging), and filtering processing. For example, in one aspect, an image can be generated by superimposing images captured at each pattern of a plurality of sets of patterns (e.g., optimized patterns as further described herein). Alternatively, or additionally, in one aspect, an image can be generated by superimposing images generated based on the one or more localized illuminations from each part of a whole image captured at each pattern of the plurality of sets of patterns. The enhanced image can be used by the system 100 for various operations. For example, the enhanced image can be displayed to the driver of a vehicle as confirmation of critical information like stop signs. In another embodiment, the enhanced image can be used by an autonomous vehicle to identify operation information like stop signs, thereby maintaining robust autonomous operation even in fog. It should be appreciated that S215 and S220 can be performed in parallel. For example, generating the enhanced image in S220 can begin once the detector (e.g., the detector 103) captures the first localized illumination in S215.

Figure 2B:
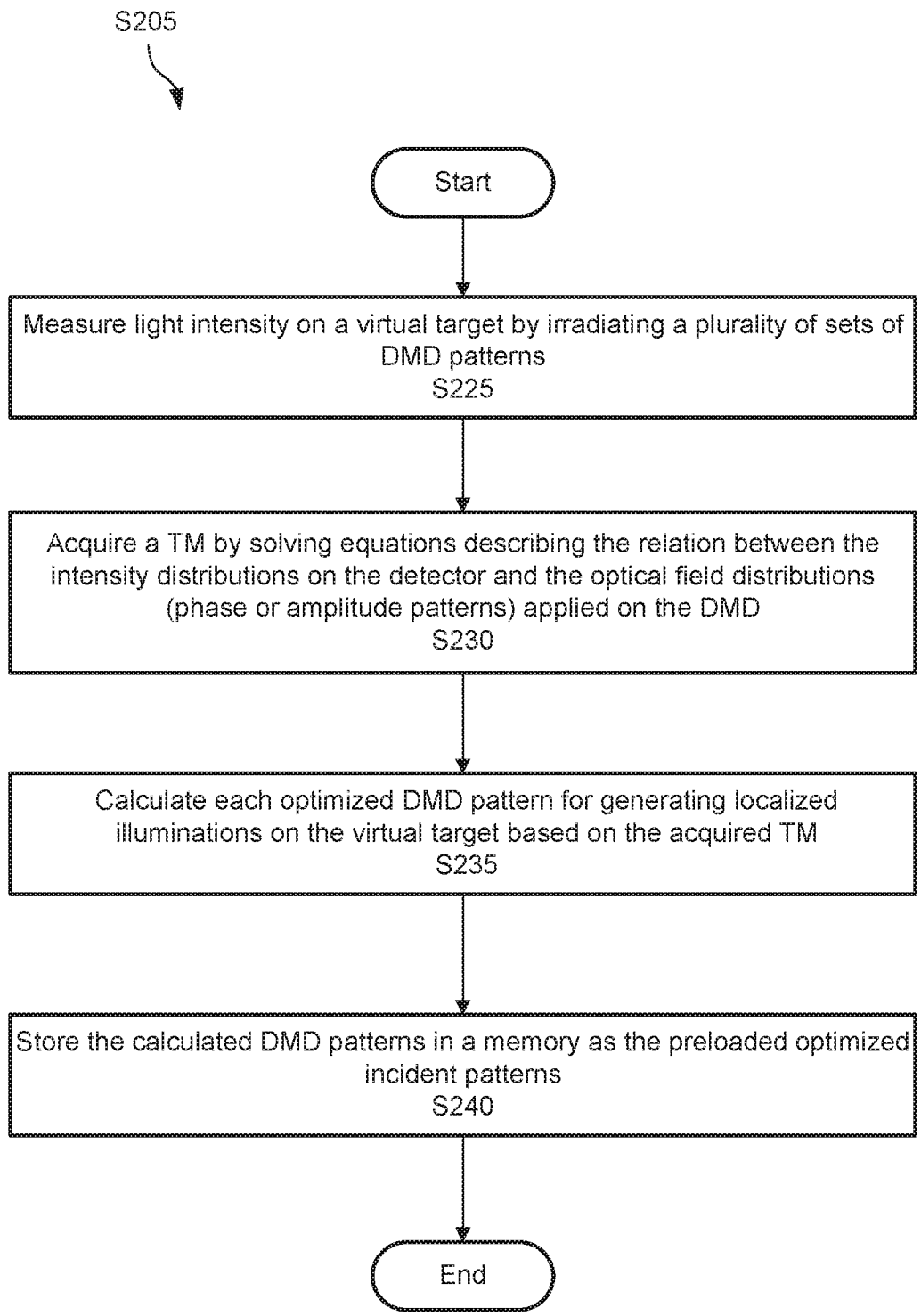
FIG. 2B is an algorithmic flow chart of a method for determining the preloaded optimized incident light patterns according to one or more aspects of the disclosed subject matter.

FIG. 2B is an algorithmic flow chart of a method for determining the preloaded optimized incident light patterns (e.g., S205 in FIG. 2A) according to one or more aspects of the disclosed subject matter.

In S225, the processing circuitry 102 can measure light intensity on a virtual target by irradiating a plurality of sets of patterns on a modulator (e.g., digital micromirror device (DMD)). In other words, arbitrarily modulated incident optical patterns via the DMD are projected toward the target object while monitoring the corresponding optical intensities reflected from the target objects with no fog present. For example, the processing circuitry 102 can be configured to irradiate pattern retrieved from a memory for generating localized illuminations on the target object in response to a signal detecting fog (e.g., camera detects fog based on change in visibility), wherein the memory stores one or more sets of patterns for a virtual target. More generally, the measurement in S225 can be performed without a scattering medium. However, even air can be considered a scattering medium, so it should be appreciated that any reference to "without a scattering medium" can refer to no fog, for example, or more generally, no scattering medium other than air. A virtual target can correspond to an object having one or more of the same size of the target object, the same structural shape of the target object, arranged in a same position as the target object, and composed by substance with a certain amount of reflectivity (e.g., enough to be detected by a camera). However, it should be appreciated that the virtual target does not have to be identical to the target object. In one aspect, the monitoring can be on the receiver side (e.g., shown in FIG. 3). The memory can store one set of the patterns for one target distance, or the memory can store a plurality of sets of the patterns for a plurality of target distances.

In S230, the processing circuitry 102 can acquire a transmission matrix (TM) by solving equations describing the relation between the intensity distributions on the detector (e.g., CCD) and the optical field distributions (phase or amplitude patterns) applied on the DMD. The TM indicates input and output response of certain light. For example, the TM can be induced based on a relationship between light field distributions on the spatial light modulator for light and an intensity of the light on the virtual target measured by a detector. In one aspect, the field distributions on the spatial light modulator can be based on a Hadamard matrix. In other words, by comparing the modulated illumination phase/amplitude patterns and corresponding intensities, the transmission matrix describing the properties of the optical system can be evaluated based on which optimized phase/amplitude pattern forming localized illuminations could be evaluated.

In S235, the processing circuitry 102 can calculate each optimized DMD pattern for generating localized illuminations on the virtual target based on the acquired TM. Calculation of the TM is based on the fact that the TM connects the input and corresponding output. Therefore, if the TM has N unknown parameters, selecting N independent input and acquiring the corresponding output, TM can be obtained by solving the N equations. In one embodiment, a Hadamard's matrix can be used to determine the independent inputs. After we have the TM for the system (e.g., scattering medium), the specific inputs (phase or amplitude distribution on DMD) can be induced which can form any desired output intensity distribution on a CCD, which can correspond to the localized illuminations on a target object, for example. Additionally, each set of patterns (e.g., optimized DMD patterns) can based on different distances from the virtual target so that when a pattern is retrieved from memory and employed on the modulator in response to fog (e.g., S210) it can be for the corresponding distance.

In S240, the processing circuitry 102 can store the calculated DMD patterns in a memory (e.g., local memory of the processing circuitry 102, a local database, a remote database, etc.) as the preloaded optimized incident patterns. After storing the optimized incident light patterns, the optimized incident light patterns are preloaded, and the processing can end.

Further, FIG. 2B elaborates on how the system 100 can be configured to enhance the brightness of the image through the scattering media to bring more light illuminated on the target object. The process of the imaging is the light control on the traveling and the capturing. The light emitted from the light source (e.g., a headlamp) travels through the medium (air in most cases), passing the optical components (e.g., lens, mirror, prism, etc.), penetrates the scattering media (e.g., fog) while experiencing heavy scattering. Some portion of light reaches the target object (e.g., road signs) and is reflected at the surface of the target object. The energy reflected depends on the reflectivity of the target object. The reflected light travels back through the scattering medium and optical components and reaches the receiver. An image of the target objects appears on the display of the receiver based on light signal conversion (e.g., light to electric signal on CCD, light into electro-chemical impulses in neurons on eyes, etc.).

The brightness of the image is an attribute (property) of visual perception. The brightness is defined as the luminance measurement on an area in an image displayed on a monitor (e.g., CCD, eye, etc.). The image brightness is determined by the intensity of illumination on the target objects, reflection losses of the light from the targets, and the light-gathering power of the imaging system. Besides the light losses by the optical system itself, including absorption by optical components, reflection losses at the optical interfaces among the optical components, and the limited spatial sizes of the optical components, the main losses of the intensity are the scattering losses due to the scattering medium. Therefore, for the known optical system and a defined target object, in which the light reflectivity of the target object is fixed, the brightness of the image depends on the light quantity (power) illuminated on the target. In other words, increasing the optical power illuminated on the target object is one of the ways to increase the brightness of the image.

For example, controlling the illumination pattern of the incident light with modulated optical phase and amplitude makes incident light more concentrated (i.e., localized) on the target object, increasing ballistic light illuminated on the target object, which directly leads to the increase of the brightness of the image. The localized light can illuminate the target object from oblique angles and collecting these high spatial frequencies can increase the resolution of the image. The localized illumination and scanning can be achieved by modulating the optical phase/amplitude of the incident light via a spatial light modulator (e.g., DMD) as further described in reference to FIG. 2B.

Figure 3:
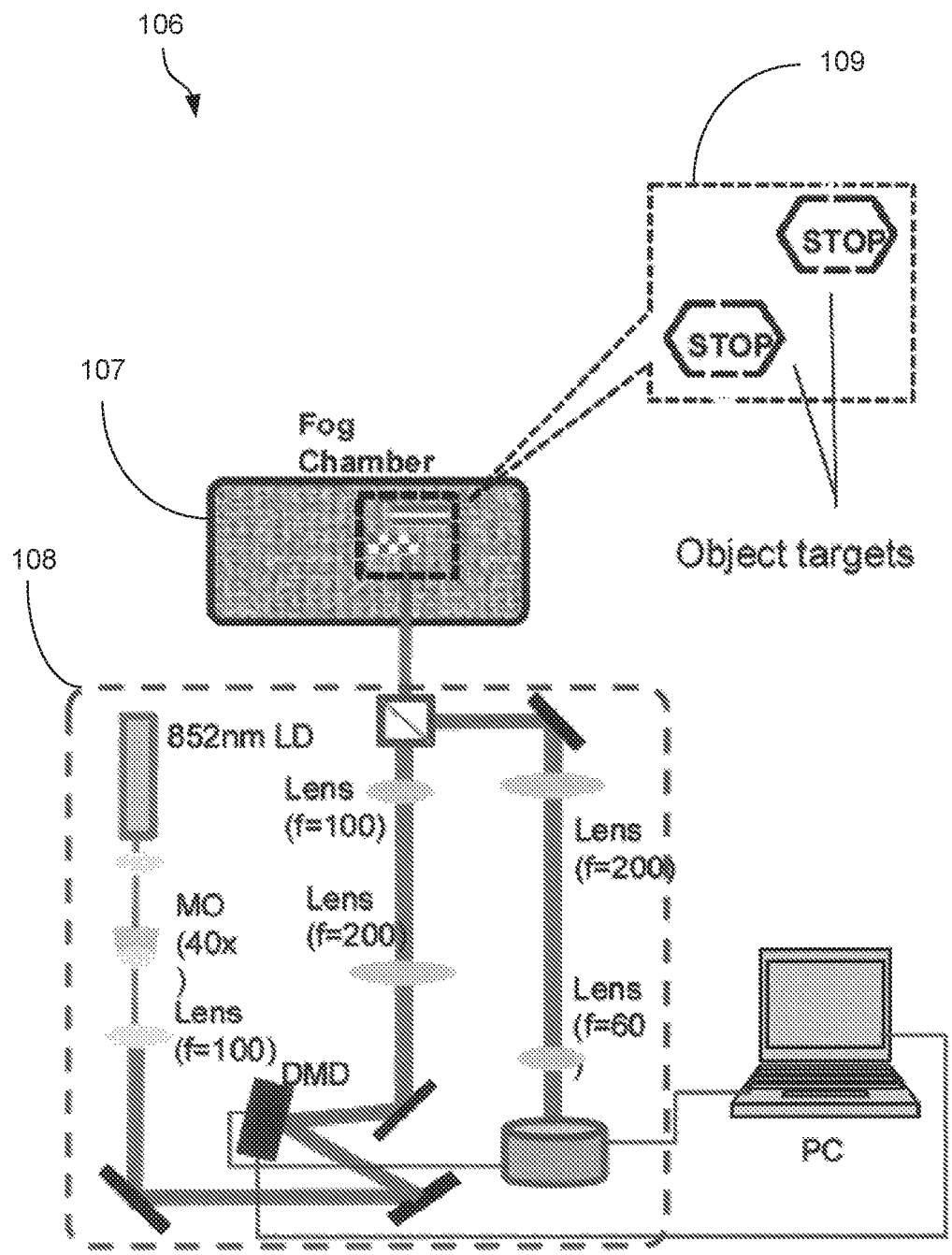
FIG. 3 illustrates an exemplary experimental setup configured to determine preloaded optimized incident patterns according to one or more aspects of the disclosed subject matter.

FIG. 3 illustrates an exemplary experimental setup configured to determine preloaded optimized incident patterns according to one or more aspects of the disclosed subject matter. The experimental setup 106 includes a fog chamber 107, including a fog generation chamber and a fog test chamber, and an optical system 108. The fog chamber 107 generates the fog (e.g., via the fog generation chamber), which is transferred by a fan into the test chamber where target objects 109 are placed (e.g., two 'STOP' signs). The optical system 108 can include an optical source, a modulator (DMD), a projection system, an imaging system, and a control system (e.g., computer). The optical source (e.g., laser, laser diode (LD), light emitting diode (LED)) is collimated and illuminated on the modulator (e.g., DMD). The phase/amplitude pattern displayed on the modulator is projected by the projection system into the fog chamber, illuminating on the target object(s) 109. The imaging system receives the reflected light from the target object(s) 109 on a receiver (e.g., detector, camera, CCD). In another embodiment, an optical system can be used in an adaptive illumination imaging system (e.g., system 100) that also include a second modulator, as shown in FIG. 4.

Figure 4:
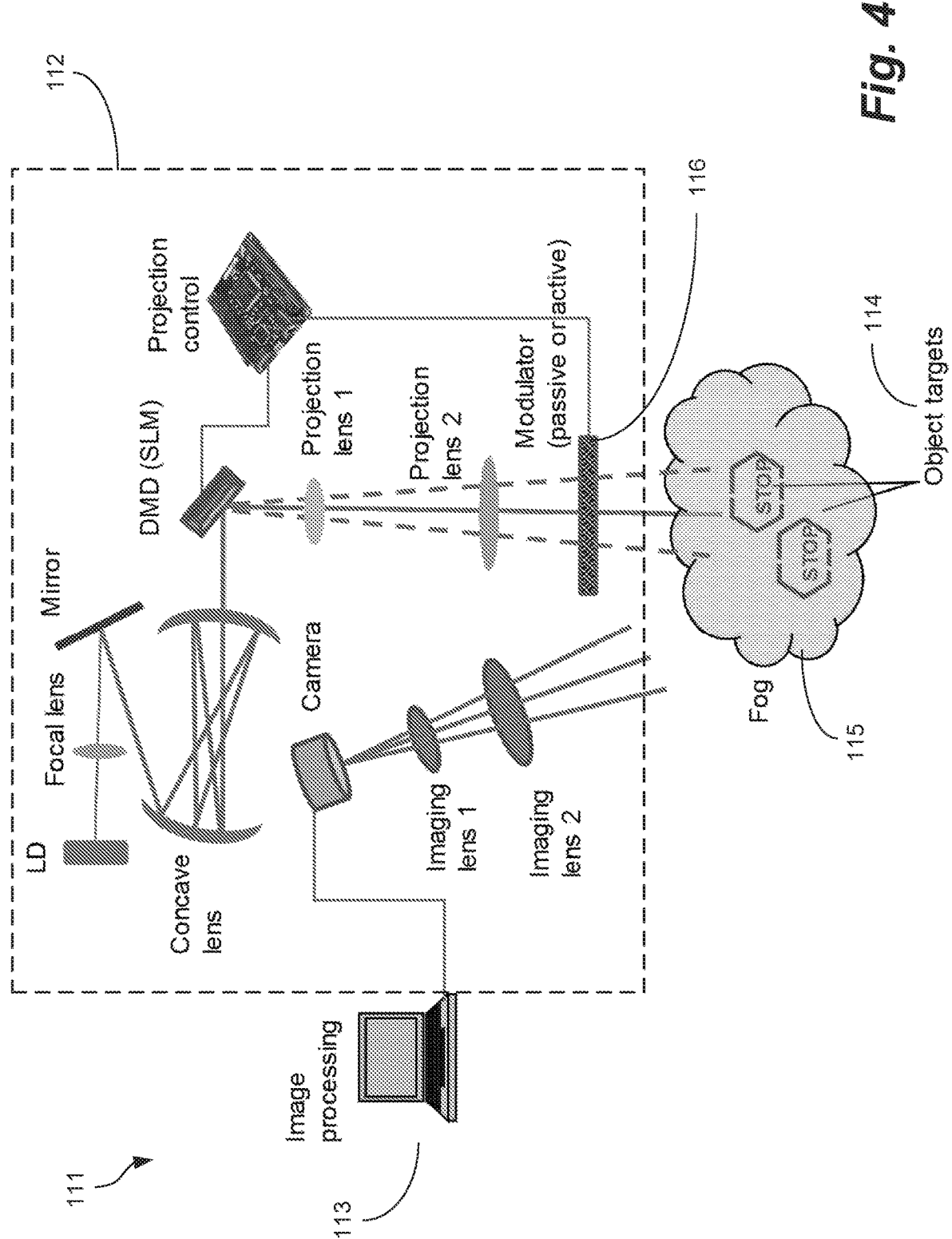
FIG. 4 illustrates an exemplary schematic diagram of an adaptive illumination imaging system according to one or more aspects of the disclosed subject matter.

FIG. 4 illustrates an exemplary schematic diagram of an adaptive illumination imaging system 111 according to one or more aspects of the disclosed subject matter. The adaptive illumination system 111 can include an optical system 112 and image processing circuitry 113. The adaptive illumination system 111 can be configured to detect target objects 114 in a scattering medium (e.g., fog 115) as described herein. In particular, the system 111 can include another modulator (e.g., modulator 116) in addition to the spatial light modulator (e.g., a digital micromirror device) that initially modulates the illumination light. More specifically, the system 111 can include concave lenses and/or mirrors to improve spatial coherence. In one aspect, the concave mirrors/lenses can be optional if the light from the light source has enough spatial coherence (e.g., above a predetermined threshold), although the concave mirrors/lenses may still improve the spatial coherence. Additionally, the DMD can be the main modulator to modulate the illumination light from the light source, while the second modulator 116 can be a passive or active spatial light modulator. For example, the passive modulator can be transparent glass plate, air, or a static scattering medium. The transmission matrix of a passive modulator can be calculated by acquiring the field (phase or amplitude) distributions corresponding to the localized illuminations on the object targets. The active modulator can be used as a passive one when its modulation capability is turned off. The active modulator can be used to future modulate or compensate the field distribution for better control on the field distribution, which can be used with the first modulator (DMD) to enhance the functionality or the degree of the modulation. The second modulator can be located on a light path in a direction of light irradiation from the spatial light modulator, or on a light path in a reflection light from the object target in front of detector. The second modulator can also be located both on a light path in a direction of light irradiation from the spatial light modulator and on a light path in a reflection light from the object target in front of detector.

First, without fog, a transmission matrix of the system can be established. In general, by measuring the responses of the random modulated input, the transmission matrix of the system can be evaluated. In order to quickly calculate the transmission matrix, modulation inputs induced from the Hadamard matrix as independent illuminations can be employed to project out of the system. A Hadamard matrix is a matrix where each row is independent and the Hadamard matrix can be used to generate the independent inputs. Usually, a plurality of inputs on the modulator (e.g., the spatial light modulator 110) are created by each row in the Hadamard matrix in order to evaluate the transmission matrix of the scattering medium. Reflected light from the target objects can be captured by the imaging system on the receiver. The inputs and measured outputs can be used to evaluate the transmission matrix of the system (see FIGS. 12A-12C).

FIGS. 5A-5G illustrate exemplary images of target objects 109 according to one or more aspects of the disclosed subject matter. With reference to FIGS. 5A-5G, the target objects 109 are placed 5 cm apart in air with the left target being in the 5 cm in front of the target on the right. It should be appreciated that in one or more aspects, the target objects can be placed more or less than 5 cm apart. With reference to FIG. 5A, the images were acquired under normal illumination of the plane wave without any modulation. Other than some speckle noise, the image system has enough depth of field to form images of target objects that are 5 cm apart. FIGS. 5B-5G shows the localized illuminations on the targets formed by the employing the acquired optimized phase/amplitude patterns on the modulator. The illuminations are localized on small areas to enhance the local illumination intensities, enabling these small areas to be seen more clearly. It should also be noted that the images in FIGS. 5A and 5B-5G can be taken with different illumination power or exposure time to avoid saturation on camera pixels.

Without fog, the normal plane wave illumination with no modulation can be used, and the image showing the details of the target objects can be acquired as shown in FIG. 5A. However, when fog appears, the details of the target object can become less clear, or even disappearing, under the normal illuminations (see FIG. 8A). When optimized phase/amplitude patterns (i.e., pre-evaluated without fog and pre-loaded in the memory) are employed on the modulator, localized illuminations can be formed on the target objects to greatly enhance the incident intensities on the target objects. Although the particles in the fog (scattering medium) scatter the incident illumination and reflected intensity when the light travels through the fog, the enhanced local illuminations enable enough light reflected from the target objects to reach the detector with enough signal to noise ratio to reveal the local information to form the target object.

Figure 6:
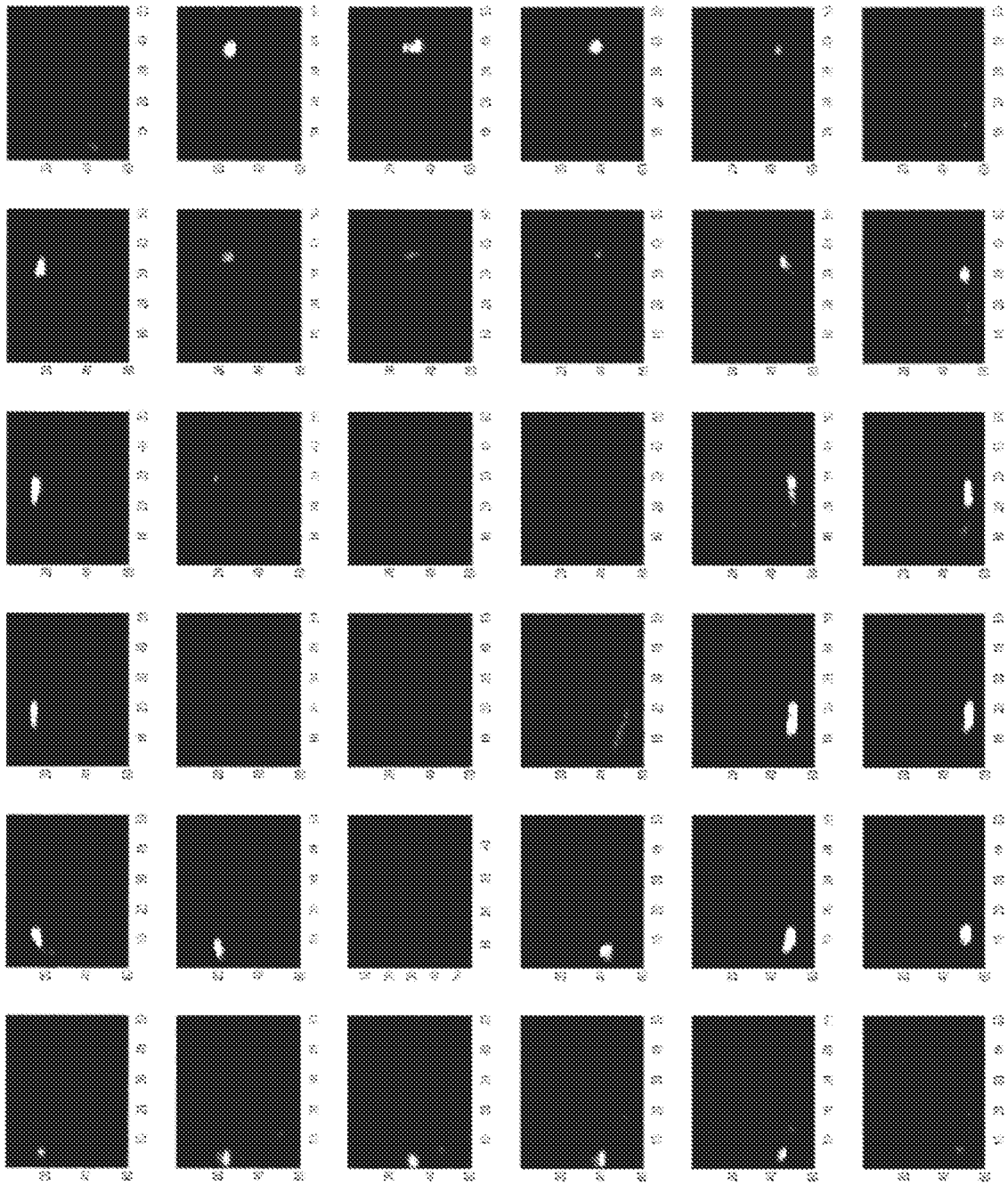
FIG. 6 illustrates images corresponding to the localized illuminations on the letter "O" on the "STOP" sign in the fog according to one or more aspects of the disclosed subject matter.

FIG. 6 illustrates images corresponding to the localized illuminations on the letter "O" on the "STOP" sign in the fog according to one or more aspects of the disclosed subject matter. For example, the images are obtained based on the preloaded optimized phase/amplitude patterns being employed on the modulator, and localized illuminations are formed and scanned on the target objects. Because the high reflectivity of the letter 'O', the localized illuminations on the letter 'O' enable more light passing back through the fog and reaching the camera with a signal to noise ratio larger than the noise. In some cases, the localized illuminations reaching other areas on the target did not reflect enough light to overcome the scattering process back through the fog due to much lower reflectivity.

As shown in FIG. 6, scanning the localized illuminations on the target objects (in this case, letter 'O') generates bright spots on the detector (e.g., camera, CCD, etc.) to reveal every part of the target object. When these images, generated by scanning the localized illuminations on the target, are formed in sequence with certain frequency, the persistence of vision can make the human eyes feel or see the letter 'O' completely. To display the enhanced effect of the image, image processing can be applied to reveal the detail of the target objects. The image processing to enhance the detail of the target object is further described herein.

For example, confocal imaging via scanning the localized illuminations along the surface of the target objects can improve the overall quality of the image. The illumination method described herein is evaluating the transmission matrix of the system, acquiring the optimized spatial distributions of the incident patterns (optical phase and/or amplitude) to form localized illuminations on the target object, and by altering the incident spatial patterns resulted from the evaluated transmission matrix, the localized light illumination can be scanned on the target object while collecting the images of the illuminated local areas.

The image on the detector is the image of the target object acquired by the scattered illumination on the target overlapped by the series of the images acquired by the scanned localized illuminations on the target object. In a first example, the image is like any normal image, and, in a second example, the image is the confocal imaging of the target object. The scattering for normal light imaging (i.e., no localized illuminations), resulted from the scattered illumination on the target object, shows just the outline of the target with low spatial frequencies, while the series of images formed by the localized illumination scans on the surface of the target object are the confocal image of the areas of the target objects.

Traditionally, confocal imaging is an optical imaging technique for increasing optical resolution and contrast of a micrograph by means of using a spatial pinhole to block out-of-focus light in image formation. The confocal imaging system achieves out-of-focus rejection by two strategies: a) by illuminating a single point of the target object at any one time with a focused beam so that illumination intensity drops off rapidly above and below the plane of focus, and b) by the use of blocking a pinhole aperture in a conjugate focal plane to the target object so that light emitted away from the point in the specimen being illuminated is blocked from reaching the detector.

In the system 100, by employing the optimized spatial distributions of the incident patterns (optical phase or and amplitude) from the acquired transmission matrix of the scattering system, the localized illuminations (e.g., focused beams) can be scanned on the target object. Therefore, a confocal imaging of the target object can be formed even though the blocking pinhole apertures are not applied in the system 100. The scanned images not only bring the high illuminating angles at the target object, which brings the high spatial frequency from the target to the detector to increase the resolution of the image, but also the focused illuminations increase the contrast of the image. The focused beams are diffraction limited at the optical system, which means that there is no stray lateral interference, which also improves the image contrast. The advantage without the pinhole apertures used in traditional confocal imaging is that the signal strength is not reduced by the requirement of a detector pinhole.

Additionally, the transmission matrix for 3D target object measurement causes concentrated light (i.e., localized illuminations) on the target object with different depths of the field. For example, two plane objects at different depth positions (e.g., 5 cm apart as described herein).

Figure 7A:
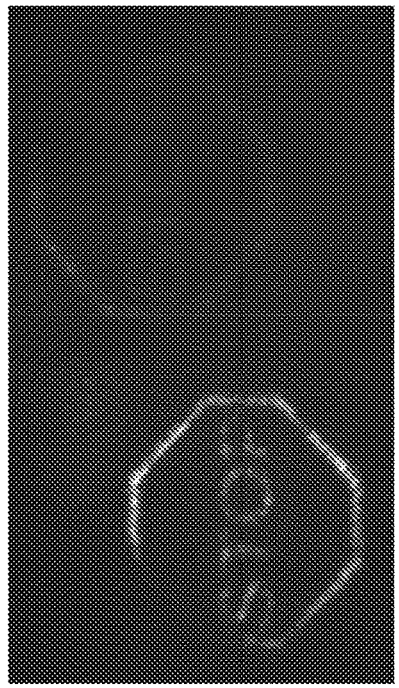
FIG. 7A illustrates an image obtained in weak fog condition with normal illumination according to one or more aspects of the disclosed subject matter.
Figure 7C:
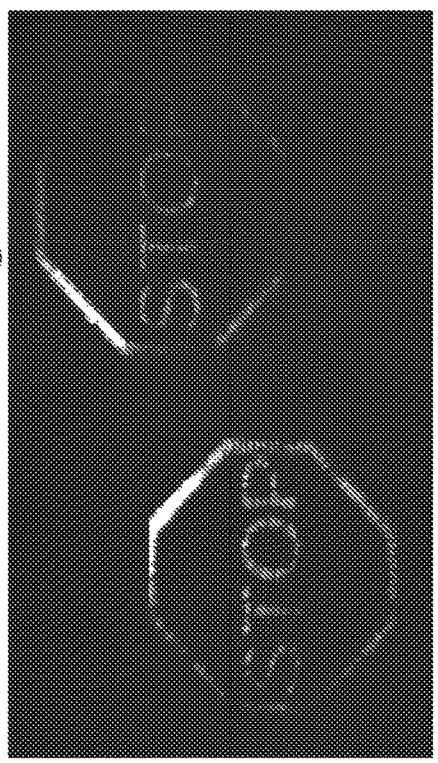
FIG. 7C illustrates an image processed using confocal imaging according to one or more aspects of the disclosed subject matter.
Figure 7B:
FIG. 7B illustrates an image processed using averaging according to one or more aspects of the disclosed subject matter.

FIGS. 7A-7C illustrate exemplary images for weak fog conditions according to one or more aspects of the disclosed subject matter.

FIG. 7A illustrates an image obtained in weak fog condition with normal illumination (i.e., no localized illuminations) according to one or more aspects of the disclosed subject matter. Under the normal illumination, the front target object (i.e., the first 'STOP' sign) can be seen clearly, while the rear target object (i.e., the second 'STOP' sign) barely reveals the outline of the sign. In order to reveal the detail of the target objects, image processing can be applied. First, FIG. 7B illustrates averaging by superimposing images being captured at each irradiation pattern for generating one or more localized illuminations. The images were added together to smooth the speckle noise. An advantage of averaging is that it reduces noise, but the disadvantage is that localized illumination is not used to enhance the image. It can be seen that after the averaging, the whole image gets clearer. Even the rear target object shows signs of an outline. Although the averaging could greatly improve the quality of the image, the advantage of the localized illuminations of modulations is not employed to enhance the image as show in FIG. 7C. The advantage of the localized illuminations is to locally increase the intensity on the target object, thereby increasing the brightness of the image. Therefore, extracting the images of the locally illuminated areas, and superimposing the extracted images to form the image of the entire target object, referred to as confocal image processing, can greatly improve the contrast of the image. As shown in FIG. 7C, the confocal image picks up the main feature of both target objects.

FIGS. 8A-8C illustrate exemplary images for heavy fog conditions according to one or more aspects of the disclosed subject matter.

In heavy fog condition, normal illumination (FIG. 8A) vaguely shows the outlines of the target objects due to heavy scattering and the front target barely shows the four letters in 'STOP' sign. Further, no information can be seen for the rear target object. Processed with averaging (FIG. 8B), the front target object improves vision in terms of noise, but the rear target object still cannot be seen. However, if localized illuminations are use in sequence and formed as a whole image, and the confocal image processing is applied (FIG. 8C), the features of the target objects can be seen. The image of the front target object shows the features of the target object and the rear target object appears although it is not as bright as the front target object. This demonstrates that the localized illuminations in sequence and accompanied confocal image processing can significantly improve the visualization even in heavy fog conditions.

Additionally, the system 100 can be configured to improve the spatial resolution via the modulations by collecting higher spatial frequencies.

Another property of the imaging quality is its resolution. Resolution quantifies how close lines can be visibly resolved. Higher resolution means more image detail could be observed. Resolution often is called spatial resolution, which refers to the ability of the imaging modality to differentiate two separate objects. Low spatial resolution optical systems cannot differentiate between two objects or points that are close together.

The resolution, for example, can correspond to the properties of the optical imaging system creating the image, not the pixel resolution of the receiver (like CCD, which also affects the imaging quality). In general, the resolution is typically affected by the diffraction effect of the size of the optical components, the aberrations due to the system imperfectness, and most importantly, atmospheric distortion due to the scattering processing when the light passes through the scattering media twice before reaching the detector.

According to the optical information theory, the resolution of an imaging system is determined by its ability of collecting high spatial frequencies, or, in other words, collecting the light beams (rays) with high emission angle from the target versus the optical axis. The resolution is then further determined by the collecting power of the imaging system.

The resolution of the imaging within the scattering medium can be increased by modulating the optical phase or amplitude by incident spatial patterns. In other words, the optical incident pattern, or wave front, is spatially divided into many pixels or elements, which hold different phase or amplitude values and vary in time. In the modulation of the incident patterns, large angle incidents onto the targets can be generated due to the scattering. Therefore, large emission (reflection) angle with high spatial frequencies from the target object can be generated and reach the detector, thereby increasing the spatial resolution of the image of the target object.

In a conventional optical imaging system, the illumination is usually plane wave with normal incidence, or parallel to the optical axis, while the reflected light is collected by the optical imaging system. The detected image on a detector (e.g., CCD) only sees the fixed aspects of the target object. When the localized illumination scanning (i.e., confocal imaging) takes place, the illuminations on the target object are not the plane wave like in a traditional optical imaging system. Instead, any object point illuminated by the focused illumination including the high spatial frequency light beam from the scattering even beyond the original entrance pupil of the image system can reach the detector, thereby revealing the details of the target object. Referred to as structural imaging, the illumination on the target object can have different phase modulations which leads to the incident angles varying based on the different phase modulations. This is similar to a synthetic aperture imaging system in which many illumination sources with different illumination angles are employed simultaneously. The different phase modulations, corresponding to different illumination angles, illuminate the different facets of the target object, and the reflected light corresponding to the different illuminations reveals the different parts or aspects of the target object. The processing of the all the acquired images under various illuminations with varied incident angles can reveal the detailed information of the target object as shown in FIGS. 9A and 9B.

Figure 9B:
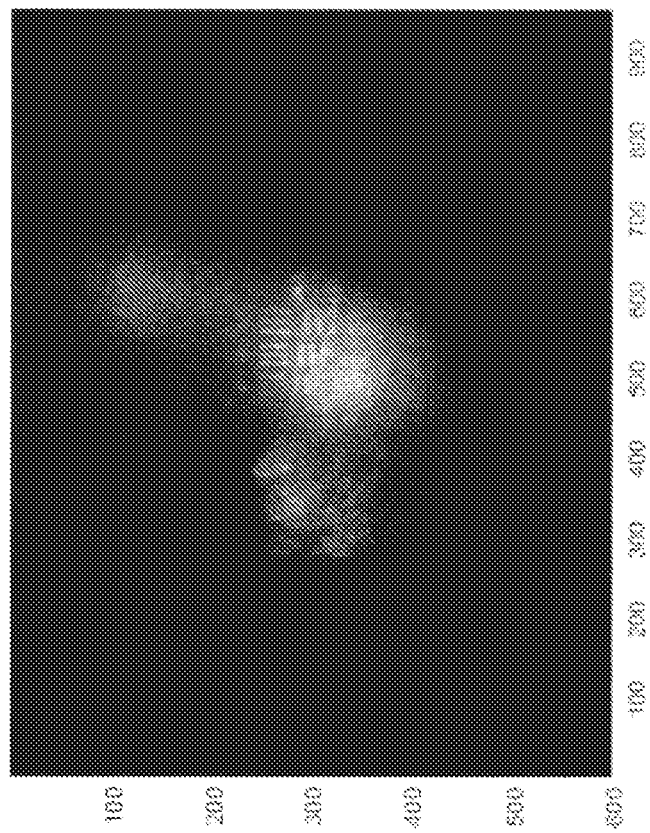
FIG. 9B illustrates an exemplary modulation technique according to one or more aspects of the disclosed subject matter.
Figure 9A:
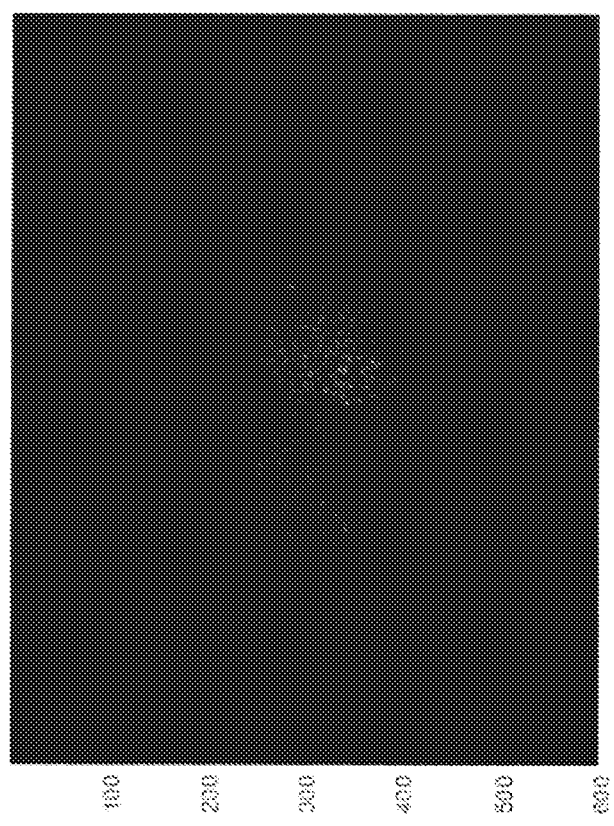
FIG. 9A illustrates an image under direct illumination of plane wave according to one or more aspects of the disclosed subject matter.

FIGS. 9A and 9B illustrate exemplary modulation technique for strong scattering according to one or more aspects of the disclosed subject matter. For example, with reference to FIG. 9A, when a heavy scattering medium exists, in which only back scattered background from the medium can be detected, no information of the target object behind the scattering medium can be seen under normal illumination (i.e., before modulation). When the illumination is replaced with a series of illuminations with different phase modulation patterns corresponding to localized illumination at different positions with varied incident angles, the image of the target object can be seen (FIG. 9B).

In traditional synthetic image processing, in which either many lighting sources or many detectors are used, the alignment of the sources or detectors must be assured, otherwise, the target objects in the image would blur because of the shifting of the target under different sources or detectors. In the system 100, the different modulations with localized illuminations on the target objects reveal the information of the targets in high spatial frequencies are all collected into the same imaging system so there is no need for any further alignment.

Generally speaking, backscattered noise from the fog is proportional to incident power on the fog. That is the reason that the high beam headlamp should be avoided in heavy fog driving conditions. Otherwise nothing will be seen except a white wall formed by the strong backscattered light from the water particles in the fog. A few approaches for increasing the signal (from the target objects) to noise (backscatter from fog) ratio have been described herein to improve the image quality. However, as long as the camera is used to take the images in the fog condition, hazing noise from the fog scattering when light passes through the fog might be hard to avoid.

The texture filtering approaches, in which the textures of the target object can be enhanced by applying the filtering on the image taken within fog to remove the haze caused by the fog scattering, would be applied to each image which is taken with incident illumination focused on the different areas of the target objects. In other words, filtering approaches can be added to remove the haze noise resulting from fog by comparing the texture details in the images in which the hazing effects are the same. In this way, the contrast of the image of the target object would be enhanced.

As has been described herein, when the localized illuminations of the modulated light are incident and scanning on the target objects, the images taken with each localized illumination are processed by confocal processing, structural processing and filtering, the image quality of the target objects can significantly improve with much better visualization improvement in terms of increased brightness, enhanced contrast, and increased resolution.

The above-described features (e.g., system(s)/method(s)) can be combined with one or more features of one or more of the embodiments in the following disclosure. One or more parts/examples in the following disclosure can be applied to the above-described features (e.g., system(s)/method(s)). Alternatively. and/or additionally, modification of one or more of the embodiments in the following disclosure can be applied to the above-described features (e.g., system(s)/method(s)). The following description provides lighting and/or imaging systems and associated methods.

The following describes lighting and/or imaging systems and associated methods with adaptive illumination and visualization enhancements. As an example, much of the following disclosure describes lighting systems and associated methods in the context of vehicle headlamp systems and associated methods for use with a vehicle (e.g., a car, truck, boat, plane, etc.). Although the following disclosure describes vehicle headlamp systems and associated methods for illuminating a roadway and/or a surrounding environment in a variety of driving conditions, other applications and other embodiments in addition to those described herein are within the scope of the present technology. For example, a person of ordinary skill in the art will readily recognize that at least some embodiments of the present technology may be useful for vehicle rear lamps, light detection and ranging (Lidar) systems, traffic lights, streetlights, lighthouses, and road signs, among other applications. As described in greater detail below, methods and/or systems configured in accordance with embodiments of the present technology are configured to use illumination reflected and/or backscattered to the lighting and/or imaging systems as feedback to adapt (e.g., maintain, modulate, adjust, and/or tailor) an illumination profile of future illumination projected from the lighting and/or imaging systems.

When certain atmospheric conditions (e.g., fog, rain, snow, dust, pollution, and/or other scattering media) are present, illumination projected in a first direction is scattered in several directions, including in a second direction generally opposite to the first direction, to create backscattered noise. This scattering reduces (i) the amount of projected illumination that reaches an object and (ii) the amount of illumination that reflects off the object and returns to a detector of a lighting and/or imaging system. As such, the intensity of the reflected signal and its signal to noise ratio in the presence of the backscattered noise and/or another signal (e.g., glare) is greatly diminished, which results in poor brightness and contrast of the object through the atmospheric conditions and/or within a captured image. In addition, the nonuniform, heavy scattering distorts both the projected illumination on its way to the object and the reflected illumination on its way back to a detector of the lighting and/or imaging system. This results in poor resolution of the object through the atmospheric conditions and/or within a captured image.

Using conventional vehicle headlamp systems as an example, neither the low nor high beam settings provide adequate forward and/or lateral illumination when heavy fog, rain, snow, dust, and/or pollution are present because illumination projected from the conventional headlamps is scattered in several directions, including toward the driver's eyes. The scattering results in poor visibility of the roadway and/or of the surrounding environment as less illumination reaches the roadway and the driver's eyes are flushed by backscattered light from the fog, rain, snow, dust, pollution, and/or other driving conditions. In addition, these driving conditions distort illumination returning to the driver's eyes after it is reflected from the roadway and/or from objects in the surrounding environment.

To address this concern, many vehicles also include fog lights. Fog lights are typically positioned low on vehicles and specifically configured to provide a flat and wide distribution of illumination to minimize scattering toward the driver's eyes in the driving conditions described above. The distribution of illumination, however, cannot be adjusted, and portions of the illumination are directed toward the eyes of other road users. For this reason, it is illegal in some jurisdictions to use fog lights outside of extremely foggy driving conditions. Furthermore, fog lights are typically provided as a separate illumination source and are often used in lieu of, or in addition to, the vehicle's conventional headlamps.

Many other conventional lighting and/or imaging systems use a variety of other approaches to address the issue of backscattered noise. For example, many conventional lighting systems use time gating detection, which involves exposing a detector to a reflected signal only at specified times to minimize detection of backscattered noise by the detector. Although this approach increases the signal to noise ratio of light reflected from an object, only ballistic light is detected by the detector. Ballistic light (i.e., photons that travel unhindered through a scattering media in a straight line) is typically an extremely small portion of the originally projected light signal. Thus, a specialized detector capable of detecting the weak return signal is required. Furthermore, because the detector is exposed only at specified times, the distance between an illuminated object and the detector must be known. As such, this approach cannot be used in settings where the lighting system and/or the illuminated objects move.

Another conventional approach is to use a reference light beam to destructively interfere with backscattered noise. In particular, a reference light beam having an optical phase opposite to that of the backscattered noise (e.g., an optical phase with a pi phase shift to the backscattered noise) is projected from the conventional lighting systems to cancel the backscattered noise. The distribution of backscattered noise, however, includes multiple optical phases from different layers of the scattering media. As such, the reference light beam destructively interferes with only a portion of the backscattered noise, meaning that not all of the backscattered noise is canceled. In addition, the conventional lighting systems do not distinguish between backscattered noise and light reflected off an object before projecting the reference light beam. As such, the reference light beam can cancel all or a portion of the reflected light signal.

Accordingly, embodiments of the present technology use adaptive illumination and/or visualization enhancement techniques in one or more lighting and/or imaging systems (e.g., in one or more vehicle headlamps) to lessen backscattered illumination and/or to increase visibility of objects in the presence of scattering media or other atmospheric conditions (e.g., glare from the sun or another source of light). In this manner, embodiments of the present technology obviate use of other conventional solutions (e.g., use of fog lights in lieu of, or in addition to, conventional vehicle headlamps; use of time gating detection; and/or use of reference light beams). In some embodiments, for example, the system uses an illumination source, one or more detectors, and a controller to selectively adapt or tailor illumination projected from a lighting and/or imaging system (e.g., from a vehicle headlamp system) to current atmospheric conditions (e.g., the presence of scattering media and/or glare). In particular, the illumination source can project illumination in accordance with an illumination profile defined by the controller. A detector can detect backscattered and/or reflected portions of the projected illumination. Based at least in part on the detected portions of illumination, the controller can adapt (e.g., maintain and/or adjust) the illumination profile to adapt (e.g., maintain and/or adjust) one or more properties of future illumination projected from the lighting and/or imaging system. These and other embodiments of the present technology can additionally use a modulator to spatially modulate and/or alter one or more properties of illumination projected from the lighting and/or imaging system.

Certain details are set forth in the following description and in FIGS. 10-19C to provide a thorough understanding of various embodiments of the disclosure. However, other details describing well-known structures and systems often associated with lighting and/or imaging systems and associated methods are not set forth below to avoid unnecessarily obscuring the description of various embodiments of the disclosure.

Many of the details, dimensions, angles, and other features shown in FIGS. 10-19C are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Figure 10:
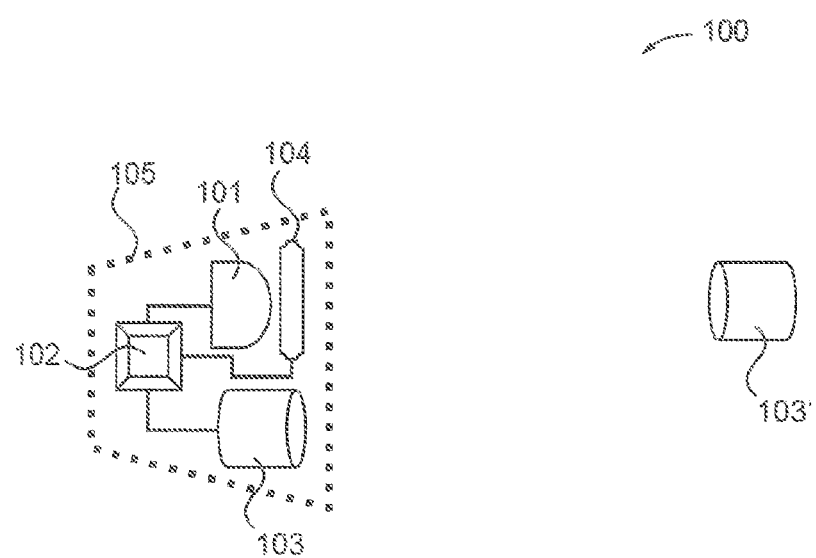
FIG. 10 illustrates a schematic diagram of an adaptive illumination lighting and/or imaging system according to one or more aspects of the disclosed subject matter.

FIG. 10 illustrates a schematic diagram of an adaptive illumination lighting and/or imaging system 100 ("the lighting system 100" or "the system 100") according to one or more aspects of the disclosed subject matter. The illustration in FIG. 10 is an example of the system 100 described in the block diagram in FIG. 1. As shown, the system 100 includes a controller 102 in communication (e.g., wired and/or wireless) with an illumination source 101, a detector 103, and a modulator 104. It should be appreciated that the controller 102 in FIG. 10 corresponds to the processing circuitry 102 in FIG. 1, and the terms can be used interchangeably. In some embodiments, the system 100 can include a casing 105. The casing 105 can be used to enclose (e.g., package and/or protect) the illumination source 101, the controller 102, the detector 103, and/or the modulator 104. The casing 105 can be light transmissive material. In these and other embodiments, the system 100 can include more than one detector 103 in communication (e.g., wired and/or wireless)

with the controller 102. For example, and as shown in FIG. 10, the system 100 can include a detector 103' oriented to detect illumination projected by the illumination source 101 and/or the detector 103 oriented to detect a portion of the projected illumination that is reflected in one or more directions, as described in greater detail below. Although not shown so as to avoid unnecessarily obscuring the description of the embodiment of the technology, the system 100 can also include other hardware and/or components for adaptive illumination and/or visualization enhancements. For example, the system 100 can include software, memory for storing the software, and/or other signal processing hardware.

In accordance with embodiments of the present technology, the illumination source 101 of the system 100 can be any source of illumination configured to project and/or emit illumination (e.g., onto a roadway and/or into the surrounding environment). For example, the illumination source 101 can be a light bulb (e.g. a halogen light bulb), a light bar, a light emitting diode (LED), a laser, a laser diode, a phosphor material (e.g., phosphor plate) illuminated by a LED, an array of illumination sources, and/or another type of illumination source. In the embodiment illustrated in FIG. 10, the illumination source 101 is a laser diode. As described in greater detail below, the illumination source 101 can be configured to project illumination through the modulator 104 and/or away from the system 100.

The first detector 103 and/or the second detector 103' of FIG. 10 can be optical power detectors, imaging sensors, or the like. For example, the first and second detectors 103, 103' can be optical detectors (e.g., image sensors, charge coupled devices (CCD's), photodiodes, cameras, etc.) configured to detect optical (e.g., visible, infrared, etc.) signals incident on the first and second detectors 103, 103'.

In these and other embodiments, the first and second detectors 103, 103' can be non-optical sensors configured to detect incident non-optical (e.g., acoustic, RF, etc.) signals. In these and still other embodiments, the first and second detectors 103, 103' can include multiple sensors. For example, the first and second detectors 103, 103' can include optical sensors coupled to non-optical sensors (e.g., for use in an underwater application). In these embodiments, the optical sensors can convert high frequency and/or short wavelength optical signals into other types of non-optical signals (e.g., acoustic signals), which can then be detected by the non-optical sensors. This configuration can filter out low frequency and/or long wavelength noise present in the environment and/or can maintain signal integrity by converting the signals to acoustic signals.

As discussed above, all or a portion of the first detector 103 and/or the second detector 103' can be enclosed in the casing 105 with the illumination source 101. In these and other embodiments, the first detector 103 and/or the second detector 103' can be positioned at locations outside of the casing 105. For example, the first detector 103 and/or the second detector 103' can be positioned within in a different casing 105, such as a casing 105 of another lighting system 100. In these and other embodiments, the first detector 103 and/or the second detector 103' may be positioned closer to a driver's eyes (e.g., at or near a windshield of the vehicle) in the context of a vehicle headlamp lighting system 100. In still further embodiments, the first detector 103 and/or the second detector 103' may have a different suitable arrangement relative to the illumination source 101. For example, and as shown in FIG. 10, the second detector 103' is positioned to detect illumination projected by the illumination source 101 rather than being positioned to detect illumination reflected from an object.

The modulator 104 shown in FIG. 10 can be a spatial and/or temporal modulator configured to modulate amplitudes, phases, wavelengths, and/or other properties of illumination projected from the illumination source 101. In some embodiments, for example, the modulator 104 is a spatial light modulator (SLM) (e.g., a liquid crystal SLM). For example, the modulator 104 can be an amplitude-based modulator, such as a digital micromirror device (DMD), configured to modulate an optical amplitude of illumination projected from the illumination source 101. In these and other embodiments, the DMD can be configured to modulate the optical phase of illumination projected from the illumination source 101 by encoding pixels of the DMD. In these and still other embodiments, the DMD can be configured to modulate the optical phase and the optical amplitude simultaneously by encoding binary pixels of the DMD.

The modulator 104 can additionally (or alternatively) be a radiation wavelength modulator. In these embodiments, the modulator 104 can be configured to change the intensity of illumination from the illumination source 101. For example, the modulator 104 can be configured to change blue emission from a laser or a LED illumination source 101 and/or to change yellow emission from a phosphor plate illumination source 101. In these and other embodiments, the modulator 104 can include the illumination source 101 and/or vice versa.

The controller 102 can be a microcontroller, special purpose logic circuitry (e.g., a field programmable gate array (FPGA), an application specific integrated circuit (ASIC), etc.), or other suitable processors. In some embodiments, for example, the controller 102 can include (i) a processor (not shown), such as a microprocessor or an on-chip processor, and (ii) an embedded memory (not shown). The processor can be configured to execute instructions stored in the embedded memory. The embedded memory can be configured to store various processes, logic flows, and routines for controlling operation of the lighting system 100, including managing communications between the illumination source 101, the detector 103, and/or the modulator 104. In some embodiments, the embedded memory can include memory registers storing, for example, memory pointers, fetched data, etc. The embedded memory can include read-only memory (ROM) for storing micro-code. While the lighting system 100 illustrated in FIG. 10 includes a controller 102, in other embodiments of the present technology the system 100 may not include a controller, and may instead rely upon external control (e.g., provided by a vehicle, by another lighting system, and/or by another system).

In operation, the illumination source 101 of the lighting and/or imaging system 100 is configured to emit illumination through the modulator 104 and/or away from the system 100. For example, the illumination source 101 can project illumination through the modulator 104 and away from the system 100 (e.g., to illuminate the roadway, an object, and/or the surrounding environment and/or to communicate information). The detector 103' can detect a portion of the projected illumination that reaches the detector 103' in the form of optical and/or non-optical signals, which can be communicated to the controller 102. Additionally, or alternatively, the detector 103 can detect backscattered and reflected illumination in the form of optical and/or non-optical signals, which can be communicated to the controller 102. As described in greater detail below, the controller 102 can adapt (e.g., maintain, update, adjust, modify, alter, tailor, etc.) an illumination profile of future illumination projected from the system 100 by adapting (e.g., maintaining, updating, adjusting, modifying, altering, tailoring, etc.) the illumination source 101 and/or the modulator 104 based, at least in part, on illumination detected by the detector 103 and/or the detector 103'. In this manner, the controller 102 can use the detected illumination as feedback regarding current atmospheric conditions and can accordingly adapt future illumination projected from the system 100 to the current atmospheric conditions to enhance the amount of illumination that reaches an object and/or to enhance visibility.

Figure 11:
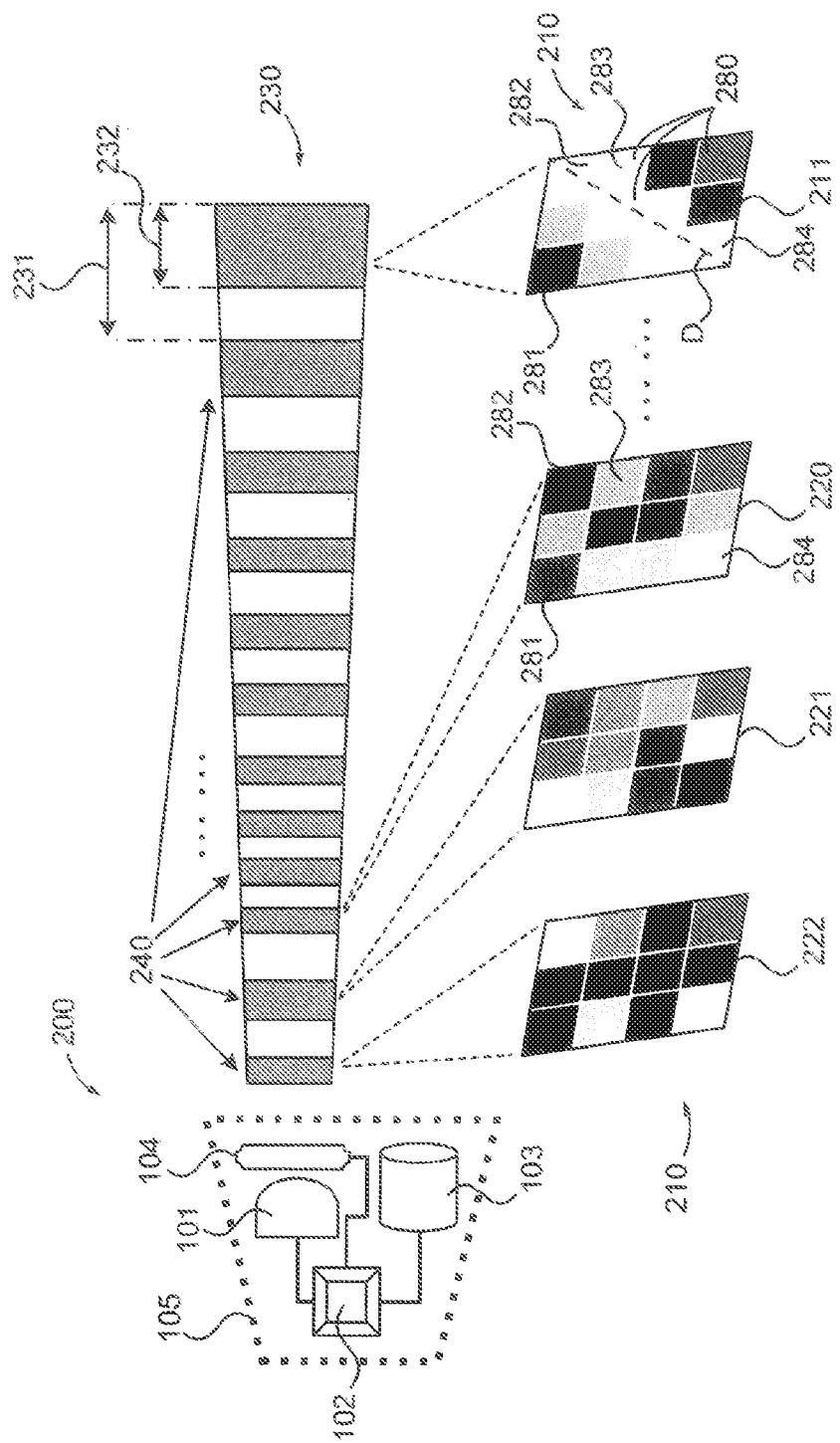
FIG. 11 is a partially schematic diagram of techniques for adaptive illumination and/or visualization enhancements using a lighting and/or imaging according to one or more aspects of the disclosed subject matter.

FIG. 11 is a partially schematic diagram of techniques for adaptive illumination and/or visualization enhancements using a lighting and/or imaging system 200 (e.g., the system 100 shown in FIG. 10) according to one or more aspects of the disclosed subject matter. For the sake of example, the lighting and/or imaging system 200 is a vehicle headlamp system 200. As discussed above, however, a person of ordinary skill in the art will readily recognize that at least some embodiments of the present technology may be useful for other applications, including vehicle rear lamps, light detection and ranging (Lidar) systems, traffic lights, street lights, lighthouses, and road signs, among others.

As shown in FIG. 11, the controller 102 is configured to instruct the illumination source 101 to project and/or the modulator 104 to pass illumination with a desired illumination profile. In some embodiments, for example, the controller 102 can instruct the illumination source 101 to project illumination with one or more desired temporal properties. For example, the controller 102 can instruct the illumination source 101 to continuously project illumination (e.g., through the modulator 104). In other embodiments, the controller 102 can instruct the illumination source 101 to project the illumination in a series 230 of one or more periodic pulses 240. In these and other embodiments, the controller 102 can define a duration 232 of one or more of the pulses 240 and/or can define one or more time intervals 231 between the beginnings of adjacent pulses 240.

Additionally, or alternatively, the controller 102 can instruct the modulator 104 to spatially modulate illumination projected from the illumination source 101. For example, the modulator 104 can include one or more programmable regions or pixels 280 through which the illumination source 101 is configured to project illumination. In these embodiments, the controller 102 can instruct the modulator 104 to program (e.g., set, maintain, alter, update, adjust, adapt, tailor, etc.) one or more properties of the regions 280 in accordance with one or more modulation grids or patterns 210 saved in memory of the headlamp system 200. The patterns 210 can correspond to one or more known driving conditions and/or to one or more specific distributions of illumination. Thus, each region 280 of the modulator 104 can pass illumination with one or more desired properties.

In some embodiments, for example, the controller 102 can instruct the modulator 104 to program the regions 280 to pass illumination with a desired spatial distribution of optical amplitudes. Using pattern 211 illustrated in FIG. 11 as an example, the controller 102 can instruct the modulator 104 to program the regions 280 such that the regions 280 (e.g., regions 282-284) along a diagonal D of the modulator 104 pass illumination with large optical amplitudes whereas regions 280 (e.g., region 281) off the diagonal D pass illumination with smaller optical amplitudes. In some embodiments, the optical amplitude distribution can be normalized (e.g., from 0-1).

In these and other embodiments, the controller 102 can instruct the modulator 104 to program the regions 280 to pass illumination with a desired spatial distribution of optical phases. In one particular example, the controller 102 can instruct the modulator 104 to program the regions 280 to pass illumination having a phase between 0 and 6.28 radians. Referring to the first pattern 211 again as an example, the controller 102 can instruct the modulator 104 to program the region 281 to pass illumination with a first optical phase and to program the region 283 to pass illumination with a second optical phase of illumination (e.g., different than the first phase).

In these and still other embodiments, the controller 102 can instruct the modulator 104 to program the regions 280 to pass illumination with a desired distribution of other properties. For example, the controller 102 can instruct the modulator 104 to program the regions 280 to pass illumination with a desired spatial distribution of wavelengths. In these and other embodiments, the regions 280 can be programmed to pass illumination with a desired spatial distribution of polarities and/or to pass (e.g., direct) illumination in desired direction(s) and/or at desired angle(s).

Generally, FIG. 12A illustrates the transmission matrix of the system with M×N dimension where M is the number of pixels (elements) on the modulator and N is the number of the pixels (elements) on the camera (e.g., CCD). Each column with M pixels in the transmission matrix in FIG. 12A corresponds to the optimize phase/amplitude modulation pattern shown in FIG. 12B, which, when displayed on the modulator, would form localized illumination on the target object shown in FIG. 12C. As a more detailed example, FIG. 12A is a schematic diagram of a transmission matrix 383 of a surrounding environment acquired using the lighting and/or imaging system 100 and/or the vehicle headlamp system 200 (FIGS. 10 and 11) according to one or more aspects of the disclosed subject matter. As shown, the transmission matrix 383 has M×N elements where M is the number of elements (e.g., pixels) of the detector 103 (e.g., of a charge coupled device (CCD)) and N is the number of elements (e.g., pixels) of the modulator 104 (e.g., of a SLM).

FIG. 12B is a schematic diagram of an optimized spatial phase distribution in a modulation pattern 310 derived from the transmission matrix 383 according to one or more aspects of the disclosed subject matter. In accordance with the discussion above, regions 280 within the modulation pattern 210 can be individually programmed (e.g., by the controller 102) to pass illumination with one or more desired properties (e.g., one or more optical phases and/or amplitudes). For example, FIG. 12C is an intensity plot 389 corresponding to the modulation pattern 310 shown in FIG. 12B. As shown in FIG. 12C, the regions 280 (FIG. 12B) in the modulation pattern 310 (FIG. 12B) can be programmed to pass illumination with an illumination profile having a localized illumination 387 of projected illumination. As described in greater detail below, the lighting and/or imaging system 100 and/or the vehicle headlamp system 200 can project one or more patterns of illumination with various localized illuminations (e.g., localized illuminations 387) to capture one or more corresponding localized illumination images (not shown). In some embodiments, the localized illumination images can be combined to enhance visualization quality of an object.

Figure 13A:
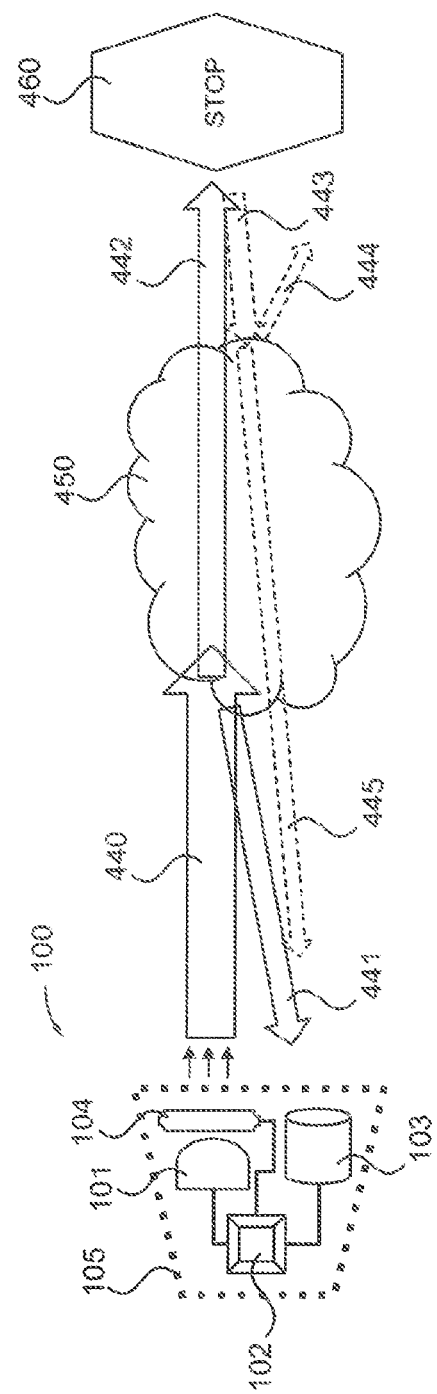
FIG. 13A is a partially schematic diagram illustrating principles of operation of the lighting and/or imaging system according to one or more aspects of the disclosed subject matter.
Figure 13B:
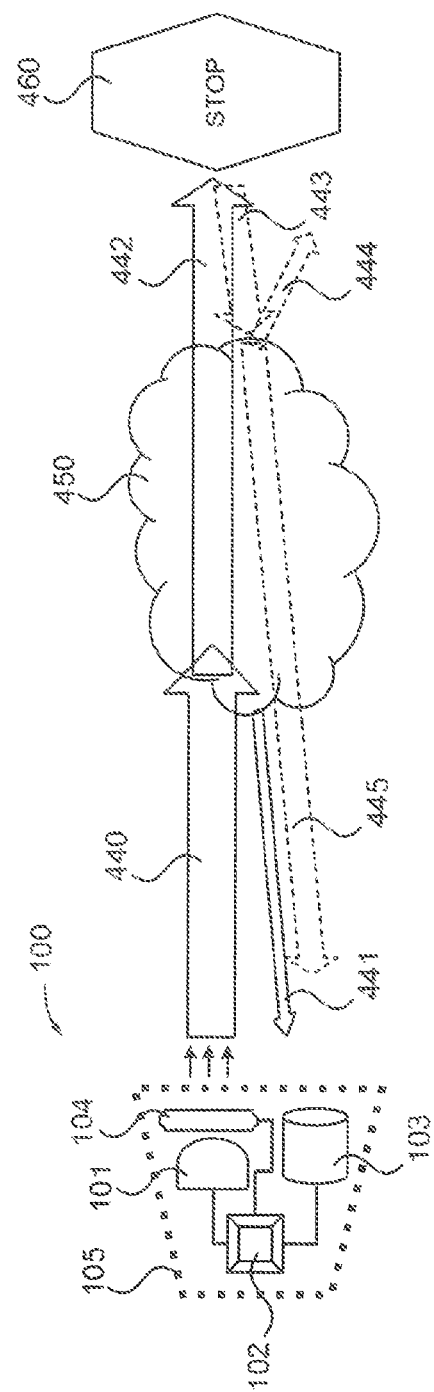
FIG. 13B is a partially schematic diagram illustrating principles of operation of the lighting and/or imaging system according to one or more aspects of the disclosed subject matter.

FIGS. 13A and 13B are partially schematic diagrams illustrating principles of operation of the lighting and/or imaging system 100 (e.g., of the vehicle headlamp system 200) according to one or more aspects of the disclosed subject matter. As shown in FIG. 13A, for example, the illumination source 101 is configured to emit illumination 440 (e.g., projected illumination 440) through the modulator 104 and away from the system 100 in accordance with the discussion above. After the illumination 440 is projected from the system 100, a first portion 441 of the projected illumination 440 is backscattered toward the system 100 when the projected illumination 440 encounters particles (e.g., fog, rain, snow, dust, pollution, etc.) in an environment 450 ahead of the system 100. This first portion 441 of the illumination is referred to herein as backscattered illumination 441 or backscattered noise and can be detected and/or measured by the detector 103 of the system 100. Absent adaptive illumination and/or visualization enhancements described in greater detail below, the amount of backscattered illumination 441 detected and/or measured by the detector 103 is positively correlated with the number of particles in the environment 450.

A second portion 442 of the illumination 440 passes through the particles in the environment 450 (e.g., unhindered and/or via forward scattering) and toward object(s) 460. The object(s) 460 can include, for example, the detector 103', a roadway, street signs, vehicles, pedestrians, trees, animals, and the like. In embodiments having a detector 103' as shown in FIG. 10, the detector 103' can detect and/or measure the second portion 442 of the illumination 440. Absent adaptive illumination and/or visualization enhancements described in greater detail below, the amount of the second portion 442 of the illumination 440 detected and/or measured by the detector 103' is negatively correlated with the number of particles in the environment 450. A part (not shown) of the second portion 442 of the illumination 440 is absorbed and/or scattered by the object(s) 460 while a remainder 443 of the second portion 442 is reflected back toward the system 100. A first part 444 of the remainder 443 is backscattered toward the object(s) 460 when the remainder 443 encounters the particles in the environment 450. In embodiments having additional detector 103' as shown in FIG. 10, the detector 103' can detect and/or measure the first part 444 of the remainder 443. Absent adaptive illumination and/or visualization enhancements described in greater detail below, the amount of the first part 444 of the remainder 443 detected and/or measured by the detector 103' is positively correlated with the number of particles in the environment 450.

A second part 445 of the remainder 443 passes through the particles in the environment 450 (e.g., unhindered and/or via forward scattering). The second part 445 of the remainder 443 is referred to herein as reflected illumination 445 and can be detected by the detector 103 of the system 100. Absent adaptive illumination and/or visualization enhancements described in greater detail below, the amount of reflected illumination 445 detected by the detector 103 is negatively correlated with the number of particles in the environment 450.

As discussed above, the detector 103 of the system 100 can be configured to detect the backscattered illumination 441 and/or the reflected illumination 445. In embodiments having a detector 103' as shown in FIG. 10, the detector 103' can be configured to detect the second portion 442 of the projected illumination 440 and/or the first part 444 of the remainder 443. The detectors 103, 103' can be further configured to convert the backscattered illumination 441, the reflected illumination 445, the second portion 442 of the projected illumination 440, and/or the first part 444 of the remainder 443 into electrical signals and communicate the electrical signals to the controller 102. This can provide an indication of how much of the projected illumination 440 reaches one or more of the object(s) 460 and/or of how much reflected illumination 445 is returned to the system 100.

Signal processing hardware (not shown) in the controller 102 can analyze the electrical signals received from the detector(s) 103, 103'. For example, the signal processing hardware can convert the electrical signals into one or more other domains or spectrums and/or can compare the resulting transform to signature transforms of known driving conditions.

Using heavy fog as an example condition, the signal processing hardware can convert the electrical signals received from the detector 103 shown in FIG. 13A into the frequency domain by taking its Fourier transform. The Fourier transform will indicate a high presence of detected illumination with several frequencies, which correspond to colors that are combined to create white backscattered illumination 441 from the fog. The Fourier transform can additionally indicate a presence of detected illumination with frequencies corresponding to the same and/or different colors of illumination that correspond to reflected illumination 445 reflected from the object(s) 460. The controller 102 can then compare the Fourier transform to the signature transforms of known driving conditions and can determine that the transform is similar to the signature transform for a high presence of fog.

In some embodiments, the controller 102 can use other parameters of the backscattered illumination 441 and/or the reflected illumination 445 in addition to or in lieu of the Fourier transform comparison. For example, the controller 102 can calculate how quickly the detector 103 detected the backscattered illumination 441 and/or the reflected illumination 445 after the illumination source 101 projected the illumination 440. In these embodiments, backscattered illumination 441 from heavy fog in the environment 450 would be detected by the detector 103 much more quickly than reflected illumination 445 from a white object 460 (e.g., vehicle, building, etc.) ahead of the system 100. Thus, if the controller 102 determines (i) that the Fourier transform indicates a high presence of detected illumination with frequencies corresponding to white wall, or glare and/or (ii) that the detected illumination was detected by the detector 103 quickly after the illumination source 101 projected the illumination 440, the controller 102 can determine that heavy fog is present.

In these and still other embodiments, the lighting and/or imaging system 100 (e.g., the controller 102) can acquire the transmission matrix (e.g., the transmission matrix 383 shown in FIG. 12A) of the environment 450 from the electrical signals received from the detector 103 and/or the detector 103'. In these embodiments, the controller 102 can derive an optimized modulation pattern 210 (FIG. 11) and/or pattern 310 (FIG. 12B) from the transmission matrix. To reduce the amount of time the controller 102 uses to determine the optimized modulation pattern 210 and/or 310 corresponding to the acquired transmission matrix, the controller 102 can use one or more optimization algorithms to compute a high dimension modulation pattern 210 and/or 310 from a low dimension transmission matrix of the surrounding environment 450 (e.g., of the scattering media in the environment 450). For example, the detector(s) 103, 103' and/or the controller 102 can acquire a low dimension transmission matrix with a small number of incident channels. The controller 102 can evaluate the low dimension transmission matrix using one or more optical patterns preloaded onto the lighting and/or imaging system 100. The controller 102 can then compute a high dimension modulation pattern 210 and/or 310 using the low dimension transmission matrix and one or more optimization algorithms (e.g., a singular value decomposition processing algorithm, an algorithm removing mathematical errors from an inverse matrix of the low dimension transmission matrix, an algorithm optimizing singular values by monitoring feedback on the detector 103, and/or an algorithm that increases the dimensions of the low dimension transmission matrix with newly generated elements, etc.).

Based on the comparison, the other parameters, and/or the optimized modulation pattern 210 and/or 310, the controller 102 can instruct the illumination source 101 and/or the modulator 104 to adapt (e.g., maintain, update, alter, modify, adjust, etc.) the illumination profile of future illumination projected by the system 100. Referring again to FIG. 11, for example, the controller 102 can instruct the illumination source 101 to adapt the duration 232 of the next pulse of illumination 440 (FIG. 13A) and/or the time interval 231 between adjacent pulses of illumination 440 in the sequence 230. In these and other embodiments, the controller 102 can instruct the modulator 104 to program the regions 280 in accordance with the pattern 210 (e.g., patterns 211, 220, 221, or 222) to adapt the spatial modulation of one or more properties of the illumination 440.

Returning to the heavy fog example and assuming that the lighting and/or imaging system 100 initially projected the illumination 440 in accordance with the pattern 211, the controller 102 can instruct the illumination source 101 to adapt (e.g., maintain and/or alter) the temporal modulation of the illumination 440 (e.g., of the next pulse of the illumination 440). Additionally, or alternatively, the controller 102 can instruct the modulator 104 to adapt (e.g., maintain and/or alter) the spatial modulation of the illumination 440. For example, the controller 102 can instruct the modulator 104 to program the regions 280 in accordance with the optimized pattern 210 (e.g., the pattern 220) corresponding to (i) the presence of heavy fog and/or (ii) the other parameters of the detected illumination (i.e., of the backscattered illumination 441 and/or of the reflected illumination 445 shown in FIG. 13A).

Referring to FIG. 13B, by adapting the temporal and/or spatial modulation of the illumination 440, the system 10 adapts the illumination 440 to the environment 450 and/or to the object(s) 460 ahead of the system 100. For example, by adapting the phase and/or amplitude of the illumination 440 (e.g., in accordance with the optimized pattern 220 instead of the pattern 211), the system 100 can increase the second portion 442 of the illumination 440 that passes through (e.g., unhindered and/or via forward scattering) particles in the environment 450 while decreasing the amount of backscattered illumination 441. In turn, the remainder 443 of the illumination 440 that is reflected from the object(s) 460 increases, meaning that the amount of reflected illumination 445 that returns to the system 100 also increases. As a result, (i) visibility is expected to be significantly enhanced because less of the illumination 440 is backscattered toward the system 100 (e.g., toward a driver's eyes) and (ii) more of the illumination 440 passes through the particles in the atmosphere 450, thereby illuminating the object(s) 460 ahead of the system 100.

Additionally, or alternatively, by adapting the illumination profile of the illumination 440, the system 100 is expected to make the object(s) 460 clearer and/or more apparent to the driver. In some embodiments, for example, the system 100 can enhance the visibility of the object(s) 460 by directing more of the illumination 440 toward the object(s) 460 and/or by adjusting one or more properties of portions of the illumination 440 directed toward the object(s) 460. This can, for example, brighten the object(s) 460 to make them more visible and/or can decrease brightness of certain areas on the object(s) (e.g., to lessen a reflective glare). In these and other embodiments, the system 100 can direct less of the illumination 440 and/or portions of the illumination 440 with different properties toward other areas in the environment 450. This is expected to enhance (i) contrast of the object(s) 460 against the environment 450 and/or (ii) the visibility and/or clarity of the object(s) 460. As discussed above with respect to FIGS. 12A-12C and as described in greater detail below, for example, the system 100 can project one or more illumination patterns with one or more localized illuminations to acquire one or more localized illumination images. Two or more localized illumination images can be combined to enhance contrast, visibility, and/or clarity of the object(s) 460.

Figure 14:
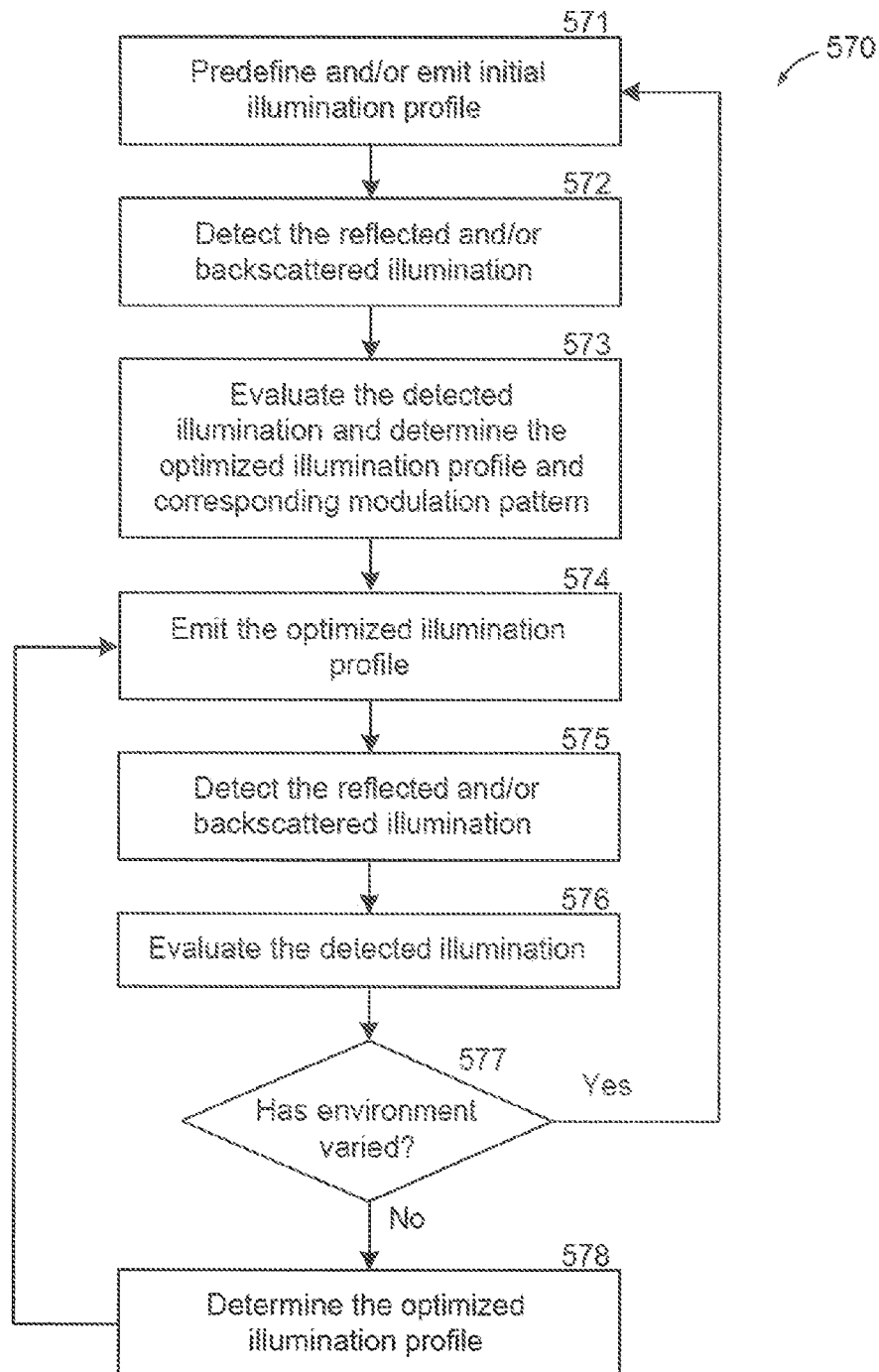
FIG. 14 is a flow diagram illustrating a structural imaging routine of a method of operating a lighting and/or imaging system according to one or more aspects of the disclosed subject matter.

FIG. 14 is a flow diagram illustrating a structural imaging routine 570 of a method of operating a lighting and/or imaging system 100 according to one or more aspects of the disclosed subject matter. For the sake of example, the routine 570 is discussed in the context of the vehicle headlamp system 200 (FIG. 11). In some embodiments, the routine 570 can be executed, at least in part, by the headlamp system 200, by another device or system (e.g., a vehicle) in communication (e.g., wired and/or wireless) with the headlamp system 200, and/or by an operator or user (e.g., a driver of the vehicle) of the headlamp system 200. For example, the routine 570 can be executed by the illumination source 101, the controller 102, the detector 103, the detector 103', and/or the modulator 104 illustrated in FIGS. 10, 11, 13A, and/or 13B.

The routine 570 can be invoked automatically and/or in response to instructions to perform structural imaging. In some embodiments, for example, the routine 570 can be invoked automatically when the headlamp system 200 is powered on (e.g., when a vehicle in which the headlamp system 200 is installed is powered on, when the headlamps of the vehicle are powered on, etc.). In these and other embodiments, the routine 570 can be automatically invoked when the detector 103 and/or the detector 103' detects impaired visibility (e.g., due to weather, dust, glare, etc.). In these and still other embodiments, the routine 570 can be invoked in response to a driver activating a set feature option (e.g., on a dash of the vehicle, on the headlamp system 200, etc.).

When invoked, the routine 570 can begin at block 571 to predefine and/or emit an initial illumination profile. In some embodiments, the initial illumination profile can correspond with a default modulation pattern. For example, the routine 570 can instruct the headlamp system 200 to emit illumination having a default temporal and/or spatial distribution of one or more properties. In some embodiments, the default property distribution can be defined during manufacture and/or testing of the headlamp system 200. In these and other embodiments, the default property distribution can correspond to a specific pattern (e.g., a first pattern, a middle pattern, a last pattern, etc.) in a sequence of patterns (e.g., saved in memory of the headlamp system 200). In still other embodiments, the default property distribution can correspond to a last illumination profile emitted from the headlamp system 200 (e.g., before the headlamp system 200 was powered off).

In other embodiments, the routine 570 can be configured to perform and/or analyze one or more measurements to predefine the initial illumination profile. For example, the routine 570 can be configured to analyze illumination detected by the detector 103 of the headlamp system 200 (e.g., to measure an amount of daylight present in the environment). Additionally, or alternatively, the routine 570 can be configured to analyze other measurements and/or information available from other systems or devices in the vehicle (e.g., rain sensors, daylight sensors, temperature sensors, another headlamp system 200, etc.). From this data, the routine 570 can define an initial illumination profile. After defining the initial illumination profile, the routine 570 can emit the illumination profile using the illumination source 101 and/or the modulator 104 of the headlamp system 200.

At block 572, the routine 570 detects reflected and/or backscattered illumination. In some embodiments, the routine 570 can detect the reflected and/or backscattered illumination using the detector 103 of the headlamp system 200. In these and other embodiments, the routine 570 can detect the reflected and/or backscattered illumination using a different detector 103 (e.g., a detector 103 of another headlamp system 200 installed in the vehicle, a detector 103 positioned near the driver's eyes, etc.). In embodiments having a detector 103' as shown in FIG. 10, the routine 570 can additionally or alternatively detect a portion of illumination projected from the illumination source 101 and incident on the detector 103' at block 572. This can provide the lighting system 100 an indication of (i) the amount of projected illumination that reaches (e.g., passes through scattering media to) the detector 103' unhindered and/or via forward scattering (e.g., an indication of the second portion 442 of the projected illumination 440 shown in FIGS. 13A and 13B) and/or (ii) the amount of reflected illumination that is backscattered (e.g., by a scattering media) toward the detector 103' (e.g., an indication of the first part 444 of the remainder 443 shown in FIGS. 13A and 13B). The detector(s) 103, 103' can convert the detected illumination into electrical signals and can communicate the signals to the controller 102 of the headlamp system 200.

At block 573, the routine 570 evaluates the detected illumination and determines an optimized illumination profile and a corresponding modulation pattern 210. In some embodiments, the routine 570 evaluates the detected illumination using signal processing hardware in the controller 102 of the headlamp system 200. In these embodiments, the routine 570 can convert the electrical signals into one or more other domains or spectrums and can compare the resulting transform to signature transforms of known driving conditions. In these and other embodiments, the routine 570 can analyze one or more other parameters of the electrical signals. For example, the controller 102 can calculate how quickly the detector 103 detected the backscattered illumination 441 and/or the reflected illumination 445 after the illumination source 101 projected the illumination 440. In these and still other embodiments, the routine 570 can acquire a transmission matrix of the surrounding environment and can compute and/or derive an optimized modulation pattern from and/or corresponding to the transmission matrix. Based at least in part on the comparison, on the one or more other parameters, and/or on the transmission matrix, the routine 570 can determine an optimized illumination profile corresponding to the current driving conditions.

At block 574, the routine 570 emits an optimized illumination profile using the corresponding modulation pattern 210. In some embodiments, the routine 570 instructs the illumination source 101 to adapt (e.g., maintain and/or adjust) one or more temporal properties of projected illumination in accordance with the corresponding modulation pattern 210. For example, the routine 570 can instruct the illumination source 101 to project continuous illumination or can instruct the illumination source 101 to project a (e.g., periodic) pulse of illumination. In these and other embodiments, the routine 570 can instruct the illumination source 101 to maintain and/or adjust a duration of the pulse of illumination and/or can instruct the illumination source to maintain and/or adjust a time interval between the beginnings of adjacent pulses of illumination in a pulse sequence 230.

In these and still other embodiments, the routine 570 can instruct the modulator 104 to adapt (e.g., maintain and/or adjust) spatial modulation of projected illumination. For example, the routine 570 can instruct the modulator 104 to program one or more regions 280 of the modulator 104 in accordance with the corresponding modulation pattern 210. In turn, the programmed regions 280 can adapt the spatial distribution of one or more properties of the projected illumination. In some embodiments, the one or more properties can include amplitude, phase, wavelength, polarity, and/or other properties, such as direction, angle, and/or localized illumination(s).

In some embodiments, the routine 570 can instruct the illumination source 101 and/or the modulator 104 to adapt one or more properties of projected illumination to increase the amount of projected illumination that is forward scattered through a scattering media. For example, the routine 570 can instruct the illumination source 101 to project and/or the modulator 104 to pass illumination with a greater amplitude or intensity (e.g., power) to increase the intensity, amplitude, and/or amount of ballistic light that passes through the scattering media, reflects off an object, and/or returns to the lighting system. In these and other embodiments, the routine 570 can instruct the modulator 104 to modulate the optical phase and/or amplitude (e.g., portions) of the projected illumination (e.g., by programming one or more of the regions 280 in the modulator 104) to increase the amount of forward scattered illumination that is concentrated (i.e., localized) onto the object. By increasing the amount, amplitude, and/or intensity of ballistic illumination and/or of illumination that is forward scattered through the scattering media, the amount and optical power of illumination incident on the object increases. In turn, the brightness of the object (e.g., the luminance measurement of the object in an image displayed on and/or viewed with a monitor, such as a CCD or an eye) through the scattering media is increased, making the object more visible.

In these and other embodiments, the routine 570 can instruct the modulator 104 to adapt one or more properties of projected illumination to decrease the amount of and/or to redirect backscattered illumination created when projected illumination encounters a scattering media. For example, the routine 570 can instruct the modulator 104 to modulate the optical phase and/or amplitude (e.g., portions) of the projected illumination such that when the projected illumination encounters the scattering media, less of the projected illumination is scattered back toward the headlamp system 200 and/or more of the projected illumination is scattered in directions away from the detector 103, the windshield of the vehicle, and/or the driver's eyes. By decreasing the amount of backscattered illumination and/or by redirecting the portions of the projected illumination that would otherwise be backscattered illumination absent optimization of the illumination profile, the signal-to-noise ratio of illumination reflected from the object and returned to the detector 103 increases. In turn, the contrast of the object (e.g., the visible difference between (i) the object and (ii) the scattering media and/or the surrounding environment) is expected to be enhanced, making the object more visible.

In these and still other embodiments, the routine 570 can instruct the modulator 104 to adapt one or more properties of projected illumination to increase the amount of high spatial frequency illumination collected by the detector 103. For example, the routine 570 can instruct the modulator 104 to modulate the optical phase and/or amplitude of (e.g., portions of) the projected illumination such that a greater amount of projected illumination passes through or is scattered by a scattering media toward the object. This can produce a greater amount of projected illumination that strikes the object at large angles relative to an optical axis, which can generate a greater amount of reflected illumination having large reflection (e.g., emission) angles relative to the optical axis and high spatial frequencies. In these and other embodiments, the routine 570 can instruct the modulator 104 to modulate the optical phase and/or amplitude of (e.g., portions of) the projected illumination such that a greater amount of the reflected illumination that reflects off the object at large angles relative to the optimal axis and that has high spatial frequencies passes through and/or is scattered by the scattering media toward the detector 103. In turn, the amount of reflected illumination that has high spatial frequencies and is detected and/or collected by the detector 103 can be increased. In this manner, the spatial resolution of the object (e.g., the ability to differentiate two separate components of the object and/or how close components of the object can be visibly resolved) can be increased, making the object more visible and clearer (e.g., through the scattering media and/or apart from another object).

At block 575, the routine 570 detects illumination in a manner similar to the routine 570 at block 572. At block 576, the routine 570 evaluates the detected illumination. In some embodiments, the routine 570 can evaluate the detected illumination in a manner similar to the routine 570 at block 573.

At block 577, the routine 570 determines whether the environment ahead of the headlamp system 200 has changed or varied. For example, the routine 570 can compare a Fourier transform of illumination detected and/or evaluated at blocks 575 and/or 576 to (i) signature Fourier transforms of known driving conditions, (ii) a Fourier transform of illumination previously detected and/or evaluated at blocks 572 and/or 573, and/or (iii) a Fourier transform of illumination previously detected and/or evaluated at blocks 574 and/or 575 (e.g., in a previous iteration of blocks 574-578). In these and other embodiments, the routine 570 can compare other information and/or parameters collected and/or analyzed at blocks 571, 574, and/or 575 and/or from other sources (e.g., other detectors 103, other sensors, etc.) to determine if the environment has varied. In these and still other embodiments, the routine 570 can determine whether the environment has varied by analyzing an acquired transmission matrix of the surrounding environment and/or comparing the acquired transmission matrix to a previously acquired transmission matrix.

If the routine 570 determines that the environment has varied (e.g., the headlamp system 200 is no longer in heavy fog but was previously during execution of blocks 571-574 and/or during a previous iteration of blocks 574-578), the routine 570 can return to block 571 to predefine and/or emit an initial illumination profile. In some embodiments, the routine 570 can use information collected and/or evaluated at blocks 575-577 to predefine the initial illumination profile when the routine 570 returns to block 571. In other embodiments, the routine 570 can discard the information collected and/or evaluated at blocks 575-577 before returning to block 571.

On the other hand, if the routine 570 determines that the environment has not varied, the routine 570 can proceed to block 578. At block 578, the routine 570 determines an optimized illumination profile. In some embodiments, the routine 570 can determine an optimized illumination profile in a manner similar to the routine at block 573 discussed above. In these and other embodiments, the routine 570 can determine an optimized illumination profile using previous iterations of blocks 574-578 and/or the optimized illumination profile determined at block 573. For example, the routine 570 can determine if one or more aspects of visibility (e.g., clarity, contrast, focus, amount of backscattered illumination, amount of reflected illumination, etc.) have been enhanced in relation to one or more previous optimized illumination profiles. In these embodiments, if the one or more aspects have not been enhanced, the routine 570 can revert to a previous optimized illumination profile and/or can determine a different optimized illumination profile (e.g., by selecting a different modulation pattern 210). Once the routine 570 determines an optimized illumination profile, the routine 570 can return to block 574 to emit illumination in accordance with the optimized illumination profile in a manner similar to the routine 570 at block 574.

In some embodiments, the routine 570 illustrated in FIG. 14 can be continuously and/or periodically performed. For example, the routine 570 can be configured to execute an iteration (e.g., blocks 571-574, 574-578, and/or 571-578) of the routine 570 every 30 µs-45 µs. In other embodiments, routine 570 can be configured to execute an iteration every few nanoseconds (e.g., every 3-50 nanoseconds). In still other embodiments, the routine 570 can be configured to execute an entire iteration every few milliseconds (e.g., every 1-50 milliseconds) and/or every few seconds (e.g., every second, every five seconds, every 30 seconds, etc.).

Although the steps of routine 570 are discussed and illustrated in a particular order, the routine 570 is not so limited. In other embodiments, the routine 570 can perform steps in a different order. In these and other embodiments, any of the steps of the routine 570 can be performed before, during, and/or after any of the other steps of the routine 570. Furthermore, a person of ordinary skill in the art will readily recognize that the routine 570 can be altered and still remain within these and other embodiments of the present technology. For example, the routine 570 in some embodiments can terminate after executing blocks 574, 577, and/or 578. Moreover, one or more steps of the routine 570 illustrated in FIG. 14 can be omitted (e.g., block 577) and/or repeated in some embodiments.

Figure 15:
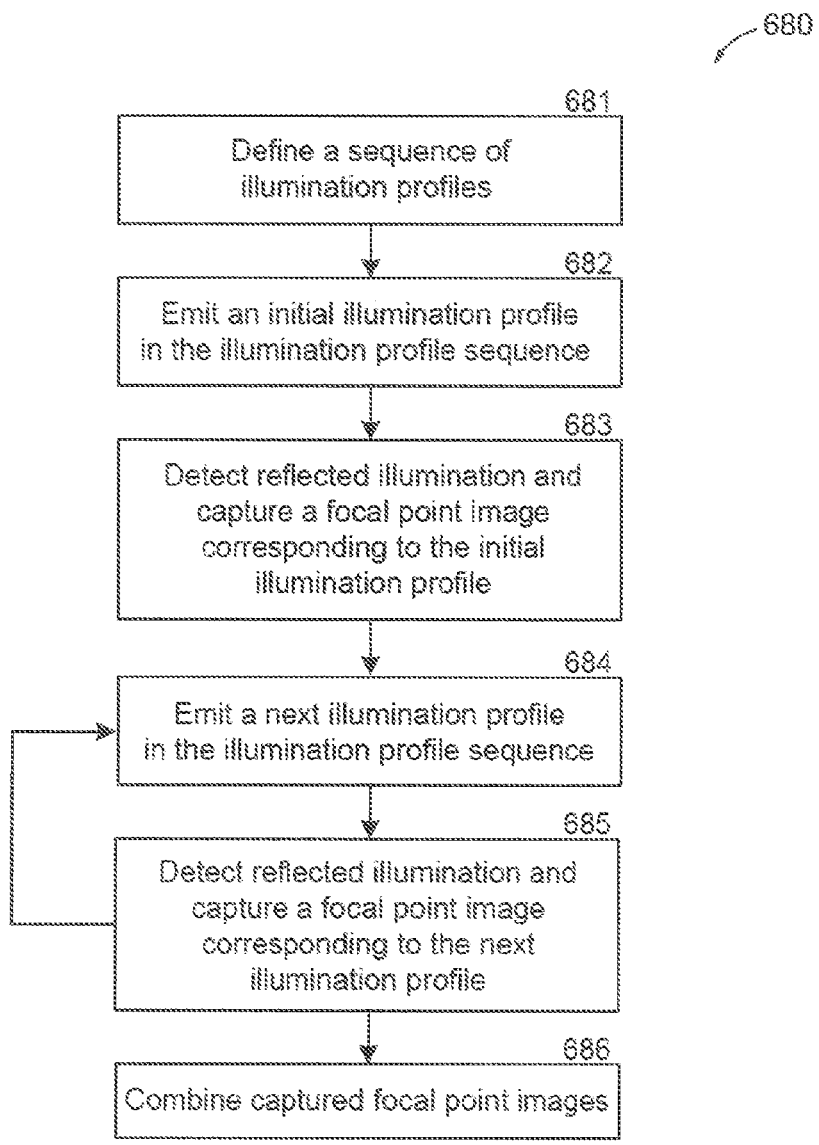
FIG. 15 is a flow diagram illustrating a confocal imaging routine of a method of operating a lighting and/or imaging system according to one or more aspects of the disclosed subject matter.

FIG. 15 is a flow diagram illustrating a confocal imaging routine 680 of a method of operating a lighting and/or imaging system 100 (e.g., the vehicle headlamp system 200) according to one or more aspects of the disclosed subject matter. In some embodiments, the routine 680 can be executed, at least in part, by the lighting and/or imaging system 100, by another device or system in communication (e.g., wired and/or wireless) with the lighting and/or imaging system 100, and/or by an operator or user of the lighting and/or imaging system 100. For example, the routine 680 can be executed by the illumination source 101, the controller 102, the detector 103, the detector 103', and/or the modulator 104 illustrated in FIGS. 10, 11, 13A, and/or 13B.

The routine 680 can be invoked automatically and/or in response to instructions to perform confocal imaging. In some embodiments, for example, the routine 680 can be invoked automatically when the lighting and/or imaging system 100 is powered on. In these and other embodiments, the routine 680 can be automatically invoked when the detector 103 and/or the detector 103' detects impaired visibility (e.g., due to weather, dust, glare, etc.). In these and still other embodiments, the routine 680 can be invoked in response to an operator activating a set feature option on the lighting and/or imaging system 100 and/or on another device or system in communication with the lighting and/or imaging system 100.

When invoked, the routine 680 can begin at block 681 to define a sequence of illumination profiles. In some embodiments, the sequence of illumination profiles can be a default sequence of one or more illumination profiles defined during manufacture and/or testing of the lighting and/or imaging system 100. For example, the sequence of illumination profiles can correspond to a default sequence of one or more modulation patterns (e.g., modulation pattern 310 shown in FIG. 12B) preloaded into the lighting and/or imaging system 100. In these and other embodiments, the default sequence can scan along all or a subset of a field of view of the lighting and/or imaging system 100. In these and still other embodiments, the routine 680 can select and/or order the one or more modulation patterns such that illumination projected from the lighting system has a selected and/or desired sequence of one or more localized illuminations (e.g., localized illumination 387 shown in FIG. 12C) of projected illumination. In these and still other embodiments, the routine 680 can be configured to perform and/or analyze one or more measurements to define the sequence of illumination profiles. For example, the routine 680 can be configured to analyze illumination detected by the detector 103 and the detector 103' of the lighting and/or imaging system 100 (e.g., to identify an object within the field of view of the lighting and/or imaging system 100, to measure an amount of daylight present in the environment, to determine a type and/or amount of scattering media present, to acquire and/or evaluate a transmission matrix of the surrounding environment and/or of the scattering media, etc.). Additionally, or alternatively, the routine 680 can be configured to analyze other measurements and/or information available from other systems or devices (e.g., rain sensors, daylight sensors, temperature sensors, another lighting system 100, etc.). From this data, the routine 680 can define the sequence of illumination profiles (e.g., to scan along the surface of an object identified within the field of view of the lighting system 100).

At block 682, the routine 680 emits an initial illumination profile in the illumination profile sequence. In some embodiments, the routine 680 instructs the illumination source 101 to project illumination with one or more temporal properties in accordance with the initial illumination profile. For example, the routine 680 can instruct the illumination source 101 to project continuous illumination or can instruct the illumination source 101 to project a (e.g., periodic) pulse of illumination. In these and other embodiments, the routine 680 can instruct the illumination source 101 to project illumination for a specified duration and/or with a specified time interval between pulses of illumination.

In these and still other embodiments, the routine 680 can instruct the modulator 104 to program one or more regions 280 of the modulator 104 in accordance with a modulation pattern 210 (e.g., the modulation pattern 310 shown in FIG. 12B) corresponding to the initial illumination profile. In turn, the programmed regions 280 can modulate the spatial distribution of one or more properties of projected illumination such that the projected illumination has one or more localized illuminations (e.g., the localized illumination 387 shown in FIG. 12C) and illuminates a specified location (e.g., a specified portion of an object identified) within the field of view of the lighting system 100 with a focused beam of illumination. In some embodiments, the one or more properties can include amplitude, phase, wavelength, polarity, and/or other properties, such as direction and/or angle.

Figure 16B:
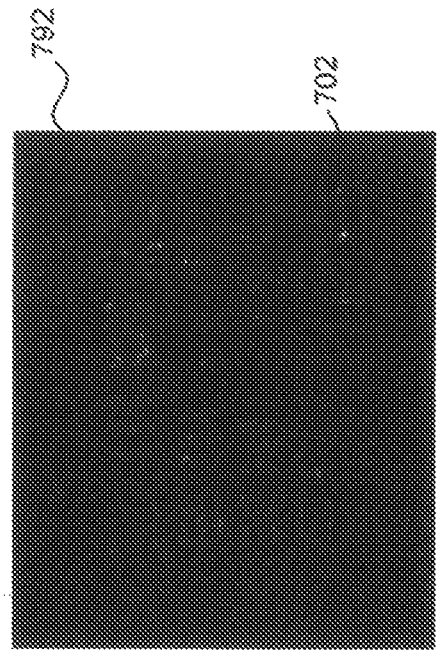
FIG. 16B illustrates a localized illumination of reflected illumination corresponding to a localized illumination of projected illumination in a projected illumination profile in the illumination profile sequence according to one or more aspects of the disclosed subject matter.
Figure 16D:
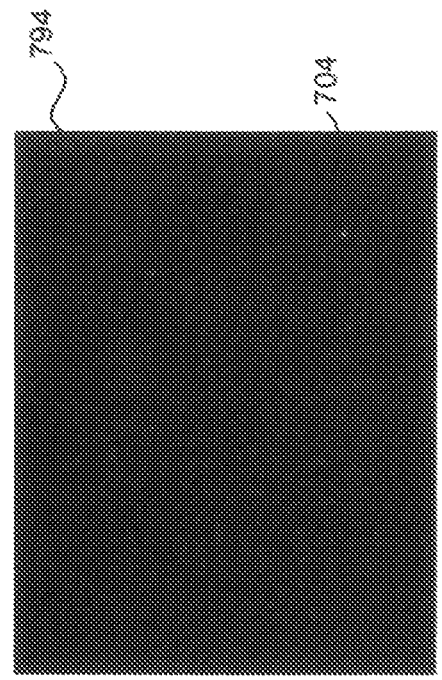
FIG. 16D illustrates a localized illumination of reflected illumination corresponding to a localized illumination of projected illumination in a projected illumination profile in the illumination profile sequence according to one or more aspects of the disclosed subject matter.
Figure 16A:
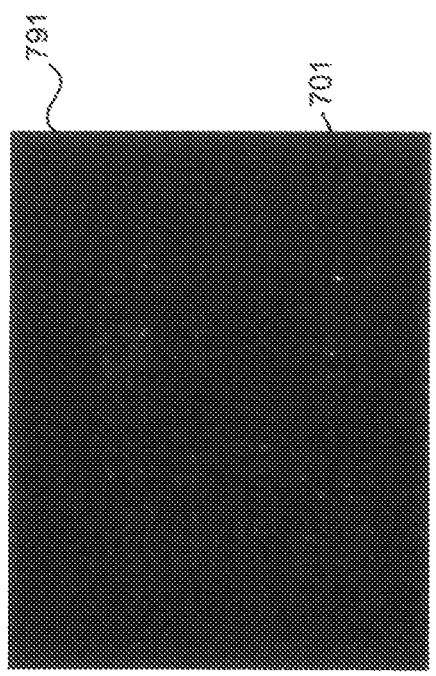
FIG. 16A illustrates a localized illumination image captured using the lighting system according to one or more aspects of the disclosed subject matter.

At block 683, the routine 680 detects reflected illumination and captures a localized illumination image corresponding to the initial illumination profile. Because the initial illumination profile included one or more localized illuminations (e.g., one or more focused beams) of projected illumination, an illumination profile of illumination that is reflected off an object and/or back toward the detector 103 of the lighting and/or imaging system 100 includes one or more corresponding localized illuminations of reflected illumination. For example, FIG. 16A is a localized illumination image 791 captured using a lighting system 100 according to one or more aspects of the disclosed subject matter. As shown, the localized illumination image 791 includes a localized illumination 701 of reflected illumination that can easily be detected and/or identified by the routine 680. That is, the localized illumination image 791 includes a point 701 at which intensity of reflected illumination is much greater than at locations surrounding the point 701. This allows the routine 680 to capture a localized illumination image without using a pinhole aperture common in other, conventional confocal lighting and/or imaging systems.

At block 684, the routine 680 emits a next illumination profile in the illumination profile sequence. In some embodiments, the routine 680 can emit the next illumination profile in a manner similar to the routine 680 at block 682. At block 685, the routine 680 detects reflected illumination and captures a localized illumination image corresponding to the next illumination profile. In some embodiments, the routine 680 detects reflected illumination and/or captures a localized illumination image corresponding to the next illumination profile in a manner similar to the routine 680 at block 685.

Figure 16C:
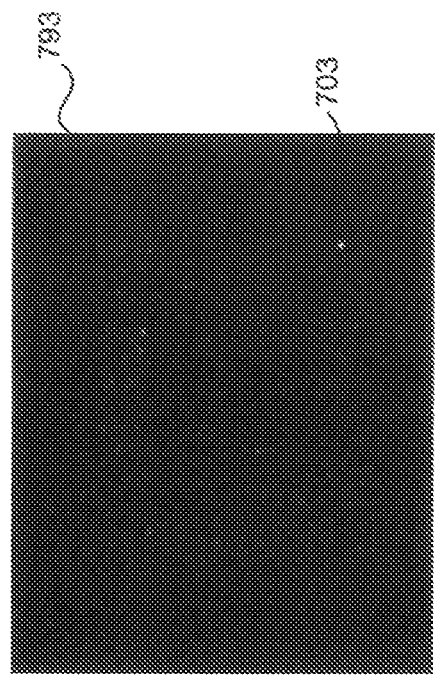
FIG. 16C illustrates a localized illumination of reflected illumination corresponding to a localized illumination of projected illumination in a projected illumination profile in the illumination profile sequence according to one or more aspects of the disclosed subject matter.

In some embodiments, the routine 680 can return to blocks 684 and 685 to (i) emit a next illumination profile in the illumination profile sequence and (ii) detect reflected illumination and/or capture a corresponding localized illumination image. For example, FIGS. 16B-16D are localized illumination images 792-794 of the object captured by the routine 680 after returning to blocks 684 and 685. In particular, the localized illumination images 792-794 were captured using three corresponding illumination profiles in the illumination profile sequence occurring after the illumination profile used to capture the localized illumination image 791 shown in FIG. 16A. Each of the localized illumination images 792-794 has a respective localized illumination 702-704 of reflected illumination. The localized illuminations 702-704 of reflected illumination correspond to localized illuminations of projected illumination in projected illumination profiles in the illumination profile sequence. Referring to FIGS. 16A-16D, the localized illuminations 702-704 are located further to the right within the respective localized illumination images 792-794 than the localized illumination 701 in the localized illumination image 791. Similarly, the localized illuminations 703 and 704 are located further to the right within the respective localized illumination images 793 and 794 than the localized illuminations 701 and 702 within the respective localized illumination images 791 and 792. The localized illumination 704 is also located further to the right within localized illumination image 794 than the localized illuminations 701-703 within the respective localized illumination images 791-793. In other words, the routine 680 can return to blocks 684 and 685 to (i) scan (e.g., interrogate points) across (e.g., the surface of the object within) the field of view of the lighting system 100 using various localized illuminations of projected illumination and (ii) detect corresponding reflected illumination and/or capture corresponding localized illumination images.

The routine 680 can continue to return to blocks 684 and 685 until the routine 680 (i) emits the last illumination profile in the illumination profile sequence. Additionally, or alternatively, the routine 680 can proceed to block 686 to combine captured localized illumination images, as discussed in greater detail below. For example, the routine 680 can proceed to block 686 before, during, and/or after returning to block 684 to emit a next illumination profile in the illumination profile sequence.

Figure 17A:
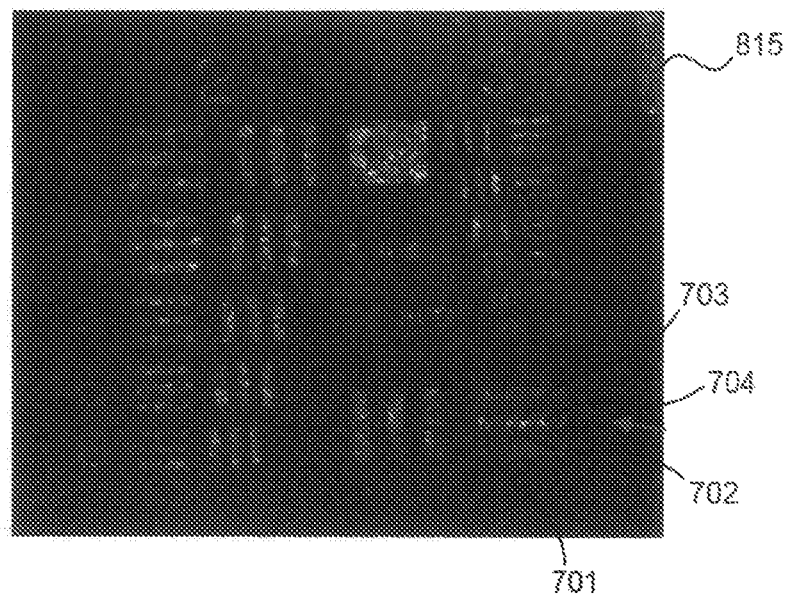
FIG. 17A is an image of an object within a field of view of an imaging system created using the localized illumination images shown in FIGS. 16A-16D according to one or more aspects of the disclosed subject matter.

At block 686, the routine 680 can optionally include combining two or more captured localized illumination images. For example, FIG. 17A is an image 815 of an object within a field of view of an imaging system 100 created using the localized illumination images 791-794 shown in FIGS. 16A-16D, respectively. In particular, the routine 680 can create the image 815 by overlapping the localized illumination images 791-794. As shown, the image 815 provides a clearer depiction of the object than any of the localized illumination images 791-794 alone. In addition, the depiction of the object is clearer at locations in the image 815 corresponding to the localized illuminations 701-704 in the localized illumination images (e.g., the depiction of the object at these locations is brighter, has a greater contrast, has a greater resolution, etc.) than the depiction of the object at other locations in the image 815. In that and other embodiments, the routine 680 can combine two or more captured localized illumination images by (e.g., noise) averaging the two or more localized illumination images together. As noted above, combining captured localized illumination images (at block 686) is an optional step that is not necessary in some implementations of the routine 680.

Figure 17B:
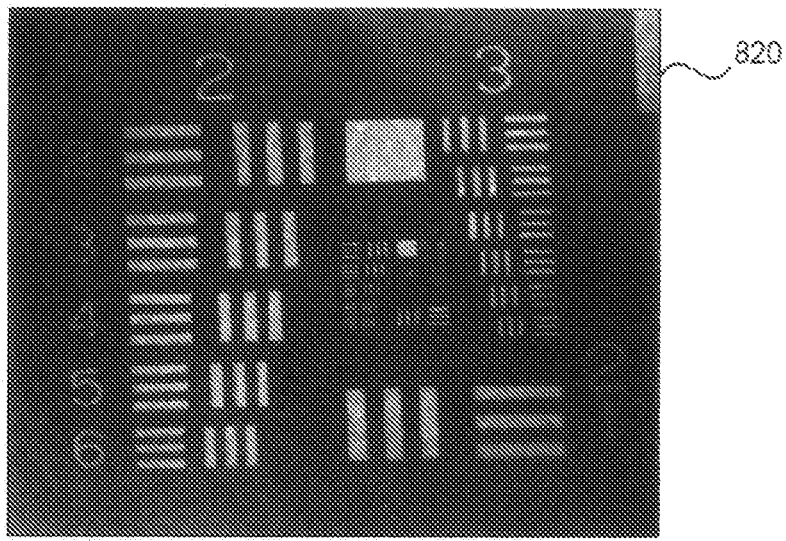
FIG. 17B is an image of the object depicted in the image shown in FIG. 17A according to one or more aspects of the disclosed subject matter.

As the routine 680 combines a greater number of localized illumination images (e.g., as more localized illumination images are captured), the depiction of the object within the field of view of the imaging system 100 becomes even clearer. For example, FIG. 17B is an image 820 of the object depicted in the image 815 shown in FIG. 17A but created by overlapping more than 1000 localized illumination images having differing localized illuminations of reflected illumination. As shown, the contrast, resolution, and visibility of the object within the image 820 is far greater than the contrast, resolution, and visibility of the object in the localized illumination images 791-794 shown in FIGS. 16A-16D, respectively, and in the combined image 815 shown in FIG. 17A. This is because the routine 680, by using localized illuminations of projected illumination to scan across the surface of the object and/or across the field of view of the lighting system 100, is able to detect (e.g., collect) and/or capture reflected illumination with high spatial frequency that reflected off the object at large angles relative to an optical axis. In addition, because the projected illumination includes one or more localized illuminations, the projected illumination is diffraction limited at the detector 103, meaning that there is no stray lateral interference. As a result, image contrast of the object is enhanced. In addition, the routine 680 is able to distinguish between multiple objects at various depths.

Although the steps of routine 680 are discussed and illustrated in a particular order, the routine 680 is not so limited. In other embodiments, the routine 680 can perform steps in a different order. In these and other embodiments, any of the steps of the routine 680 can be performed before, during, and/or after any of the other steps of the routine 680. Furthermore, a person of ordinary skill in the art will readily recognize that the routine 680 can be altered and still remain within these and other embodiments of the present technology. For example, the routine 680 in some embodiments can terminate after executing blocks 682, 683, 684, 685, and/or 686. Moreover, one or more steps of the routine 680 illustrated in FIG. 15 can be omitted and/or repeated in some embodiments.

Figure 18:
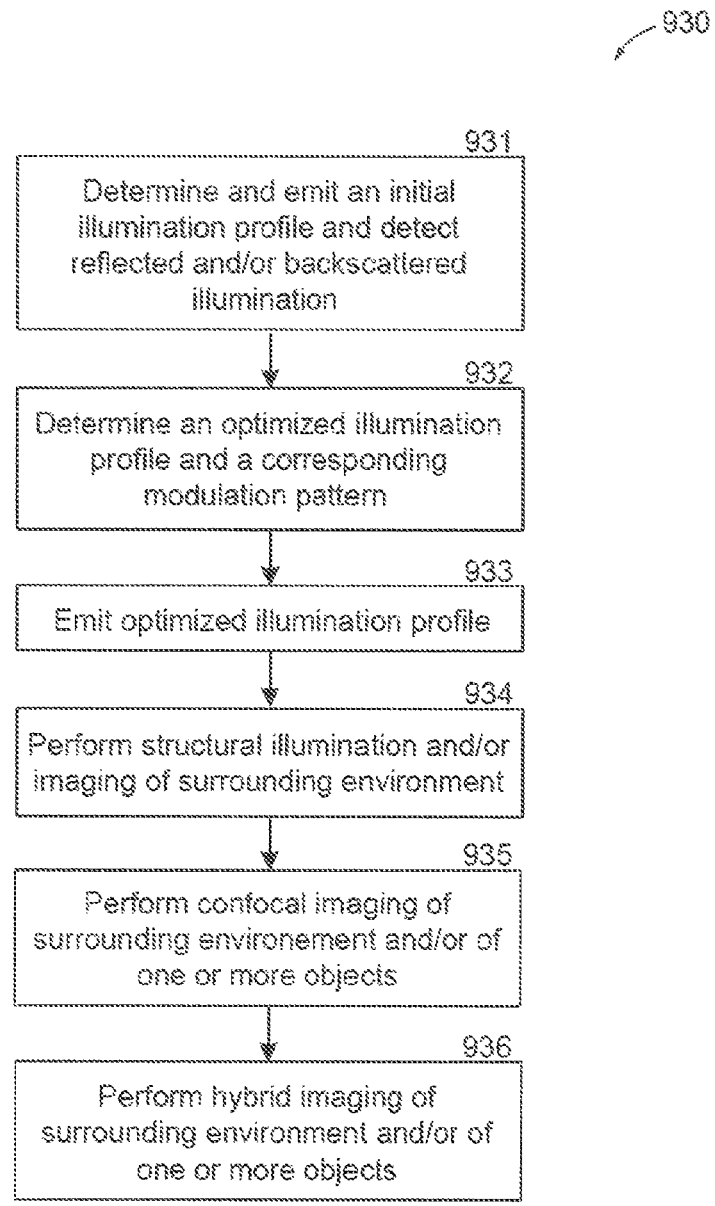
FIG. 18 is a flow diagram illustrating a hybrid imaging routine of a method of operating lighting and/or imaging system according to one or more aspects of the disclosed subject matter.

FIG. 18 is a flow diagram illustrating a hybrid imaging routine 930 of a method of operating lighting and/or imaging system 100 (e.g., the vehicle headlamp system 200) in accordance with embodiments of the present technology. In some embodiments, the routine 930 can be executed, at least in part, by the lighting and/or imaging system 100, by another device or system in communication (e.g., wired and/or wireless) with the lighting and/or imaging system 100, and/or by an operator or user of the lighting and/or imaging system 100. For example, the routine 930 can be executed by the illumination source 101, the controller 102, the detector 103, the detector 103', and/or the modulator 104 illustrated in FIGS. 10, 11, 13A, and/or 13B.

The routine 930 can be invoked automatically and/or in response to instructions to perform hybrid imaging. In some embodiments, for example, the routine 930 can be invoked automatically when the lighting and/or imaging system 100 is powered on. In these and other embodiments, the routine 930 can be automatically invoked when the detector 103 and/or the detector 103' detects impaired visibility (e.g., due to weather, dust, glare, etc.). In these and still other embodiments, the routine 930 can be invoked in response to an operator or user activating a set feature option on the lighting and/or imaging system 100 and/or on another device or system in communication with the lighting and/or imaging system 100.

When invoked, the routine 930 can begin at block 931 to determine and emit an initial illumination profile and to detect reflected and/or backscattered illumination. In some embodiments, the routine 930 can determine and emit an initial illumination profile and/or can detect reflected and/or backscattered illumination in a manner similar to the routine 570 at blocks 571, 572, and/or 573 discussed above with respect to FIG. 14.

At block 932, the routine 930 determines an optimized illumination profile and acquires a corresponding modulation pattern 210. In some embodiments, the routine 930 can determine the optimized illumination profile and/or can acquire the corresponding modulation pattern 210 in a manner similar to the routine 570 at block 573 discussed above with respect to FIG. 14.

At block 933, the routine 930 emits the optimized illumination profile using the corresponding modulation pattern 210. In some embodiments, the routine 930 can emit the optimized illumination profile using the corresponding modulation pattern 210 in a manner similar to the routine 570 at block 574 discussed above with respect to FIG. 14. For example, the routine 930 can modulate one or more properties of illumination projected by the lighting system 100 using the illumination source 101 and/or the modulator 104 to (i) increase the amount of projected illumination that is forward scattered toward an object, (ii) decrease the amount of and/or redirect projected illumination that is backscattered toward the lighting system (e.g., toward the detector 103), and/or (iii) increase the amount of high spatial frequency illumination collected by the detector 103.

At block 934, the routine 930 performs structural illumination and/or imaging of the surrounding environment. In some embodiments, the routine 930 can perform structural imaging of the surrounding environment in a manner similar to the routine 570 at blocks 575-578 and/or 571-578 discussed above with respect to FIG. 14. In these and other embodiments, the routine 930 performs structural imaging of the surrounding environment to capture ballistic light images of the surrounding environments. In these and still other embodiments, the routine 930 can average two or more ballistic light images of the surrounding environment together (e.g., if the environment has not varied at block 577 of the routine 570 shown in FIG. 14) to increase the signal-to-noise ratio of the reflected illumination detected by the detector 103. In this manner, the routine 930 can increase the brightness and image contrast of (e.g., objects within the) surrounding environment (e.g., through the scattering media).

Additionally, or alternatively, the routine 930 performs confocal imaging of the surrounding environment and/or of one or more objects. For example, the routine 930 can perform confocal imaging simultaneously with or sequentially before and/or after the routine 930 performs structural imaging of the surrounding environment (at block 934). In embodiments where the routine 930 performs confocal imaging after and/or simultaneously with performing structural imaging (at block 934), the routine 930 can use an acquired transmission matrix of the surrounding environment (e.g. of the scattering media), the optimized illumination profile, and/or a corresponding modulation pattern 210 to perform the confocal imaging. In some embodiments, the routine 930 can perform confocal imaging in a manner similar to the routine 680 at blocks 681-686 discussed above with respect to FIG. 15.

At block 936, the routine 930 performs hybrid imaging of the surrounding environment and/or of one of more objects. In some embodiments, the routine 930 performs hybrid imaging of the surrounding environment by combining (i) one or more ballistic lights images of the surrounding environment captured by the routine 930 while the routine 930 performed structural imaging of the surrounding environment at block 934 with (ii) one or more localized illumination images captured by the routine 930 while the routine 930 performed confocal imaging analysis of the surrounding environment and/or of one or more objects at block 935. For example, the routine 930 can combine one or more ballistic light images with one or more localized illumination images by averaging the ballistic light images with the localized illumination images. In these and other embodiments, the routine 930 can combine one or more ballistic light images with one or more localized illumination images by overlapping the confocal images onto the ballistic light images. In these and still other embodiments, the routine 930 can combine one or more ballistic light images with one or more localized illumination images by (i) averaging the ballistic light images together and (ii) overlapping the confocal images onto the averaged ballistic light image.

For the sake of example. FIGS. 19A-19C are provided to illustrate effects of several embodiments of the present technology and of the routine 930. FIG. 19A, for example, is an image 1040 of an object in the absence of scattering media and captured using lighting and/or imaging system 100. FIG. 19B is an image 1050 of the object shown in FIG. 19A before optimization in the presence of a scattering media and captured using the lighting and/or imaging system 100. FIG. 19C is a hybrid image 1060 of the object shown in FIGS. 19A and 19B after optimization in the presence of the scattering media and captured using the lighting and/or imaging system 100. Blown up portions 1041, 1051, and 1061 of the images 1040, 1050, and 1060, respectively, are also shown in FIGS. 19A-19C, respectively, to more easily view portions 1045, 1055, and 1065, respectively.

Referring to FIG. 19A, the portion 1045 of the image 1040 and of the blown-up portion 1041 includes a vertical line. As shown, in the absence of a scattering media, the vertical line is slightly visible and distinguishable from other features of the object. In this example, the vertical line has a contrast (SNR) of 1.98 and a resolution of 20p/mm.

Referring to FIG. 19B, when a scattering media is present, the vertical line in the portion 1055 of the image 1050 and the blown-up portion 1051 appears distorted and is harder to distinguish from other features of the object than the same vertical line in the portion 1045 shown in FIG. 19A. In particular, the vertical line in the image 1050 has a contrast (SNR) of 0.25 and a resolution 1.4p/mm, which are both far worse than the vertical line in the image 1040 shown in FIG. 19A. The brightness of the vertical line in the blown-up portion 1051 of the image 1050 is 6,385. This is due (at least in part) to an increased presence of backscattered noise created as illumination projected from the lighting and/or imaging system 100 is scattered toward the detector 103 of the lighting and/or imaging system 100 by the scattering media.

Referring to FIG. 19C, after the lighting and/or imaging system 100 employs hybrid imaging of the object (e.g., structural imaging combined with confocal imaging), the brightness, contrast, and resolution of the vertical line in the portion 1065 of the image 1060 is enhanced in comparison with both the vertical line in the image 1050 shown in FIG. 19B and the vertical line in the image 1040 shown in FIG. 19A. In particular, the brightness of the vertical line in the image 1060 after optimization has increased to 84,800. Similarly, the contrast of the vertical line in the image 1060 after optimization has been enhanced 2.08, and the resolution of the vertical line in the image 1060 after optimization has been enhanced to 14p/mm.

In this manner, the routine 930 is able to (i) enhance illumination of (e.g., objects within) an environment surrounding a lighting and/or imaging system 100 and/or (ii) enhance visibility and/or clarity of objects within the surrounding environment. This is accomplished through (a) structural imaging of the surrounding environment and/or (b) confocal imaging of the surrounding environment and/or of objects within the surrounding environment. More specifically, the routine 930 enhances illumination and/or imaging of the surrounding environment and/or of objects within the surrounding environment by (i) increasing an amount of projected illumination that is forward scattered through a scattering media in the surrounding environment, (ii) decreasing the amount of and/or redirecting noise and/or illumination backscattered toward the detector 103 by the scattering media, (iii) increasing the amount of high spatial frequency illumination collected by the detector 103, and/or (iv) illuminating (e.g., scanning) all or a subset of the surrounding environment with one or more localized illuminations of projected illumination.

Although the steps of routine 930 are discussed and illustrated in a particular order, the routine 930 is not so limited. In other embodiments, the routine 930 can perform steps in a different order. In these and other embodiments, any of the steps of the routine 930 can be performed before, during, and/or after any of the other steps of the routine 930. Furthermore, a person of ordinary skill in the art will readily recognize that the routine 930 can be altered and still remain within these and other embodiments of the present technology. For example, the routine 930 in some embodiments can terminate after executing any of the blocks 931-936 of the routine 930. Moreover, one or more steps of the routine 930 illustrated in FIG. 18 can be omitted and/or repeated in some embodiments.

Although not shown so as to avoid unnecessarily obscuring the description of the embodiments of the technology, any of the forgoing systems and methods described above in FIGS. 10-19C can include and/or be performed by a computing device (e.g., including the controller 102) configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output devices, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include computer readable media (e.g., the storage device, disk drives, and/or other storage media, excluding only a transitory, propagating signal per se) including computer-executable instructions stored thereon that, when executed by the processor and/or computing device, cause the systems to perform adaptive illumination and/or visualization enhancements as described in detail above with reference to FIGS. 10-19C. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, other applications and other embodiments in addition to those described herein are within the scope of the present technology. In the context of vehicle rear lamp systems, various aspects and components of the embodiments described herein can be useful to increase the amount of illumination that reaches a trailing driver and/or vehicle in poor driving conditions. This can increase the visibility of the vehicle in which the rear lamp system(s) are installed, which can decrease the likelihood that an accident (e.g., a collision) occurs. The same principles apply in the context of traffic light, streetlight, lighthouse, and road sign lighting and/or imaging systems. Furthermore, although steps are presented in a given order above, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

In the above description of FIGS. 2A, 2B, 14, 15, and 18, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 20:
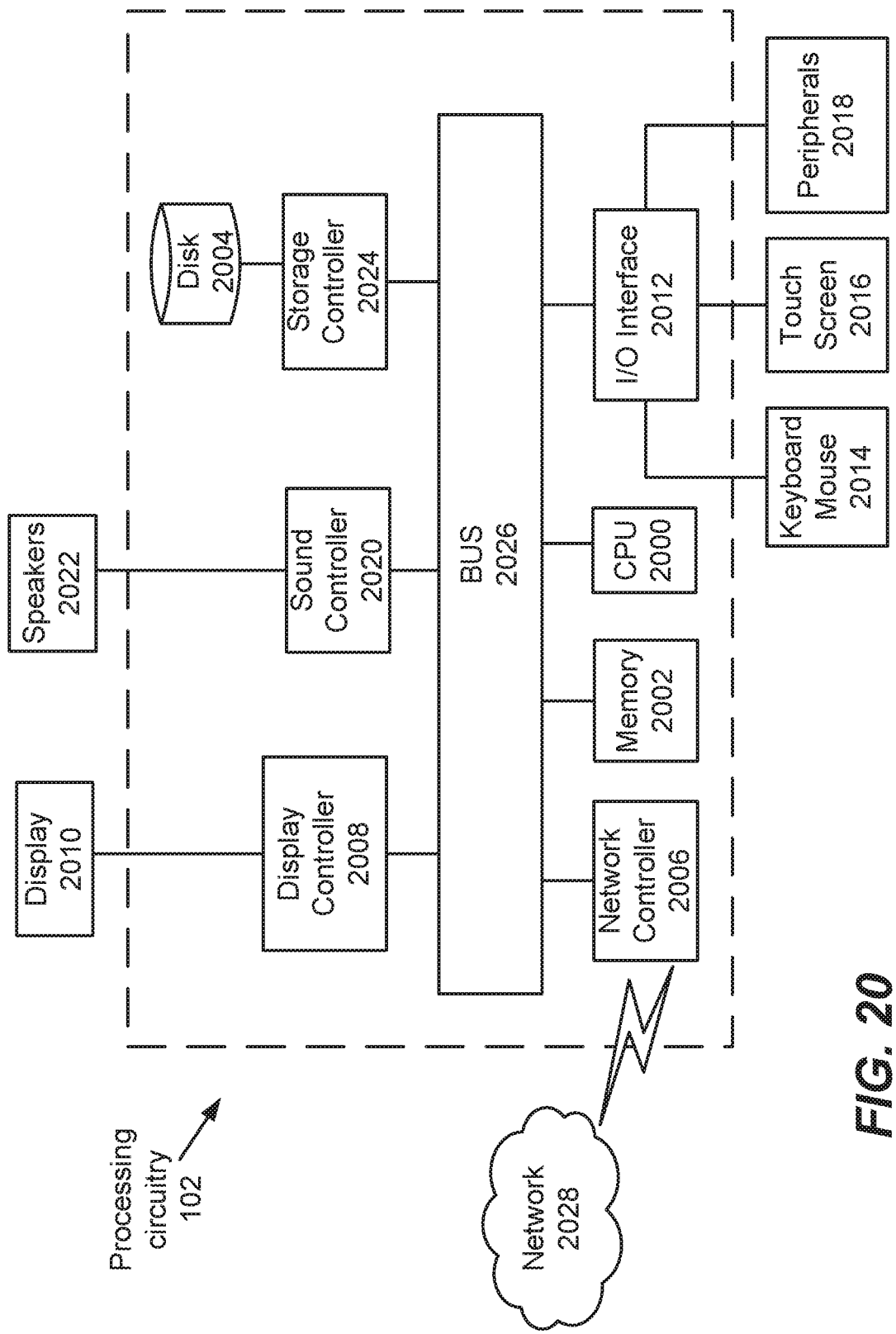
FIG. 20 is a hardware block diagram of a controller according to one or more exemplary aspects of the disclosed subject matter.

Next, a hardware description of a computer/device (such as the controller and/or processing circuitry 102) according to exemplary embodiments is described with reference to FIG. 20. The hardware description described herein can also be a hardware description of the processing circuitry. In FIG. 20, the processing circuitry 102 includes a CPU 2000 which performs one or more of the processes described above/ below. The process data and instructions may be stored in memory 2002. These processes and instructions may also be stored on a storage medium disk 2004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 102 communicates, such as a server or computer.

Further, the claimed advancements may be provided as a utility application, background daemon, or component of an operating system, or combination thereof, executing in conjunction with CPU 2000 and an operating system such as Microsoft Windows, UNIX, Solaris, LINUX, Apple MAC-OS and other systems known to those skilled in the art.

The hardware elements in order to achieve the processing circuitry 102 may be realized by various circuitry elements. Further, each of the functions of the above described embodiments may be implemented by circuitry, which includes one or more processing circuits. A processing circuit includes a particularly programmed processor, for example, processor (CPU) 2000, as shown in FIG. 20. A processing circuit also includes devices such as an application specific integrated circuit (ASIC) and conventional circuit components arranged to perform the recited functions.

In FIG. 20, the processing circuitry 102 includes a CPU 2000 which performs the processes described above. The processing circuitry 102 may be a general-purpose computer or a particular, special-purpose machine. In one embodiment, the processing circuitry 102 becomes a particular, special-purpose machine when the processor 2000 is programmed to use ballistic light modulations for image enhancement through fog (and in particular, any of the processes discussed with reference to FIGS. 2A, 2B, 14, 15, and 18).

Alternatively, or additionally, the CPU 2000 may be implemented on an FPGA, ASIC, PLD or using discrete logic circuits, as one of ordinary skill in the art would recognize. Further, CPU 2000 may be implemented as multiple processors cooperatively working in parallel to perform the instructions of the inventive processes described above.

The processing circuitry 102 in FIG. 20 also includes a network controller 2006, such as an Intel Ethernet PRO network interface card from Intel Corporation of America, for interfacing with network 2028. As can be appreciated, the network 2028 can be a public network, such as the Internet, or a private network such as an LAN or WAN network, or any combination thereof and can also include PSTN or ISDN sub-networks. The network 2028 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The processing circuitry 102 further includes a display controller 2008, such as a graphics card or graphics adaptor for interfacing with display 2010, such as a monitor. A general purpose I/O interface 2012 interfaces with a keyboard and/or mouse 2014 as well as a touch screen panel 2016 on or separate from display 2010. General purpose I/O interface also connects to a variety of peripherals 2018 including printers and scanners.

A sound controller 2020 is also provided in the processing circuitry 102 to interface with speakers/microphone 2022 thereby providing sounds and/or music.

The general-purpose storage controller 2024 connects the storage medium disk 2004 with communication bus 2026, which may be an ISA, EISA, VESA, PCI, or similar, for interconnecting all of the components of the processing circuitry 102. A description of the general features and functionality of the display 2010, keyboard and/or mouse 2014, as well as the display controller 2008, storage controller 2024, network controller 2006, sound controller 2020, and general purpose I/O interface 2012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An apparatus, comprising:
a light source;
a spatial light modulator configured to modulate one or more of phase and amplitude of light irradiated from the light source to a target object;
a memory storing information of irradiation patterns on a virtual target located at a predetermined distance, wherein the virtual target is a physical object having one or more of a same size, structural shape, position, and at least a predetermined amount of reflectivity as the target object; and processing circuitry configured to drive the spatial light modulator by modulation signals for the irradiation patterns for generating one or more localized illuminations, the one or more localized illuminations being arranged in a matrix on the target object, wherein each localized illumination corresponds to an area of the target object with an enhanced light intensity such that the enhanced light intensity of the localized illumination is maximized on the target object by increasing ballistic light illuminated on the target object;

scan the one or more localized illuminations on the target object based on the irradiation patterns, wherein the circuitry for scanning the one or more localized illuminations on the target object based on the irradiation patterns is further configured to, in response to detecting fog, irradiate the irradiation patterns retrieved from the memory for generating the localized illuminations on the target object; and calculate, in advance, the irradiation patterns so that light intensity of the one or more localized illuminations is enhanced on the virtual target located at a predetermined distance and without a scattering medium.

2. The apparatus according to claim 1, wherein the memory stores information of one or more of sets of the irradiation patterns on the virtual target.

3. The apparatus according to claim 2, wherein the memory stores information of a plurality of sets of the irradiation patterns on the virtual target, each set of the plurality of patterns being measured at a different distance from the virtual target.

4. The apparatus according to claim 1, wherein the processing circuitry for calculating the irradiation patterns is based on a transmission matrix, the transmission matrix being induced as a relationship between light field distributions on the spatial light modulator of certain lights and intensity of the certain lights on the virtual target measured by a detector.

5. The apparatus according to claim 4,
wherein the field distributions on the spatial light modulator are based on a Hadamard matrix.

6. The apparatus according to claim 1, further comprising, an image capturer configured to generate image data by capturing an image of the target object.

7. The apparatus according to claim 1, further comprising, a second modulator on a light path in a direction of light irradiation from the spatial light modulator or on a light path in front of a detector.

8. The apparatus according to claim 6, wherein the processing circuitry is further configured to
generate a first image by superimposing second images, the second images being captured at each pattern of the irradiation patterns.

9. The apparatus according to claim 6, wherein the processing circuitry is further configured to
generate a third image by superimposing fourth images, the fourth images being generated by extracting the one or more localized illuminations from each part of a whole image captured at each pattern of the irradiation patterns.

10. A method for generating an image, comprising:
storing, via a memory, information of irradiation patterns on a virtual target located at a predetermined distance, wherein a virtual target is a physical object having one or more of a same size, structural shape, position, and at least a predetermined amount of reflectivity as a target object;

driving a spatial light modulator by modulation signals for the irradiation patterns for generating one or more localized illuminations, the localized illuminations being arranged in a matrix on the target object, wherein each localized illumination corresponds to an area of the target object with an enhanced light intensity such that the enhanced light intensity of the localized illumination is maximized on the target object by increasing ballistic light illuminated on the target object;

scanning the one or more localized illuminations on the target object based on the irradiation patterns, wherein the scanning includes, in response to detecting fog, irradiating the irradiation patterns retrieved from the memory for generating the localized illuminations on the target object; and calculating, in advance, the irradiation patterns so that light intensity on the one or more localized illuminations is enhanced on the virtual target located at a predetermined distance and without a scattering medium.

11. The method of claim 10, further comprising:
wherein the memory stores information of one or more sets of the irradiation patterns on the virtual target.

12. The method of claim 10, wherein calculating a pattern of the irradiation patterns is based on a transmission matrix, the transmission matrix being induced as a relationship between light field distributions on the spatial light modulator of certain lights and intensity of the certain lights on the virtual target measured by a detector.

13. The method of claim 10, further comprising:
receiving input from a Hadamard matrix to generate the field distributions on the spatial light modulator.

14. The method of claim 10, further comprising:
generating image data by capturing an image of the target object.

15. The method of claim 10, further comprising:
irradiating the irradiation patterns on the virtual target through a second modulator, the second modulator being on a light path in a direction of light irradiation from the spatial light modulator or on the light path in front of a detector.

16. The method of claim 10, further comprising:
generating a first image by superimposing second images, the second images being captured at each pattern of the irradiation patterns.

17. The method of claim 10, further comprising:
generating a third image by superimposing fourth images, the fourth images being generated by extracting the one or more localized illuminations from each part of a whole image captured at each pattern of the irradiation patterns.

18. An apparatus, comprising:
a light source;
a modulator configured to modulate one or more of phase and amplitude of light irradiated from the light source to a target object;
a memory storing information of irradiation patterns on a virtual target located at a predetermined distance, wherein the virtual target is a physical object having one or more of a same size, structural shape, position, and at least a predetermined amount of reflectivity as the target object; and processing circuitry configured to preload optimized incident patterns for localized illuminations scanning acquired without a scattering medium, wherein each localized illumination in the localized illuminations scanning corresponds to an area of the target object with an enhanced light intensity such that the enhanced light intensity of the localized illumination is maximized on the target object by increasing ballistic light illuminated on the target object, apply the optimized incident patterns on the modulator in response to the scattering medium being identified, acquire images corresponding to the scanned localized illuminations, and generate an enhanced image of the target object based on the acquired images.

19. The apparatus of claim 18, wherein the processing circuitry for preloading optimized incident patterns is further configured to measure light on a virtual target by irradiating a plurality of sets of modulator patterns, induce a transmission matrix indicating a relationship between light intensity on an imaging device and light field distribution of the modulator, calculate each optimized modulator pattern for generating localized illuminations on the virtual target based on the induced transmission matrix, and store the calculated modulator patterns in a memory as the preloaded optimized incident patterns.

20. The apparatus of claim 18, further comprising:

a second modulator in a direction of light irradiation from the modulator or on light path in front of a detector, wherein the processing circuitry is further configured to irradiate the optimized incident patterns on the virtual target through the second modulator.

* * * * *